(12) United States Patent
Li et al.

(10) Patent No.: US 9,754,204 B2
(45) Date of Patent: Sep. 5, 2017

(54) SYSTEMS, METHODS AND DEVICES FOR VECTOR CONTROL OF PERMANENT MAGNET SYNCHRONOUS MACHINES USING ARTIFICIAL NEURAL NETWORKS

(71) Applicant: Board of Trustees of The University of Alabama, Tuscaloosa, AL (US)

(72) Inventors: Shuhui Li, Northport, AL (US);
Michael Fairbank, London (GB);
Xingang Fu, Tuscaloosa, AL (US);
Donald Wunsch, Rolla, MO (US);
Eduardo Alonso, St Albans (GB)

(73) Assignee: Board of Trustees of The University of Alabama, Tuscaloosa, AL (US)

( * ) Notice: Subject to any disclaimer, the term of this patent is extended or adjusted under 35 U.S.C. 154(b) by 605 days.

(21) Appl. No.: 14/451,768

(22) Filed: Aug. 5, 2014

(65) Prior Publication Data
US 2015/0039545 A1 Feb. 5, 2015

Related U.S. Application Data

(60) Provisional application No. 61/862,277, filed on Aug. 5, 2013.

(51) Int. Cl.
*H02P 21/00* (2016.01)
*G06N 3/08* (2006.01)
*G05B 13/02* (2006.01)

(52) U.S. Cl.
CPC ............. *G06N 3/08* (2013.01); *G05B 13/027* (2013.01)

(58) Field of Classification Search
USPC ........................................ 318/400.02, 568.19
See application file for complete search history.

(56) References Cited

U.S. PATENT DOCUMENTS

2003/0218444 A1* 11/2003 Marcinkiewicz ......... H02P 6/10
318/727
2005/0184689 A1 8/2005 Maslov et al.
(Continued)

OTHER PUBLICATIONS

Barnard, E., "Temporal-Difference Methods and Markov Models," IEEE Transactions on Systems, Man, and Cybernetics, vol. 23, No. 2, 1993, pp. 357-365.
(Continued)

*Primary Examiner* — Jorge L Carrasquillo
(74) *Attorney, Agent, or Firm* — Meunier Carlin & Curfman LLC

(57) ABSTRACT

An example method for controlling an AC electrical machine can include providing a PWM converter operably connected between an electrical power source and the AC electrical machine and providing a neural network vector control system operably connected to the PWM converter. The control system can include a current-loop neural network configured to receive a plurality of inputs. The current-loop neural network can be configured to optimize the compensating dq-control voltage. The inputs can be d- and q-axis currents, d- and q-axis error signals, predicted d- and q-axis current signals, and a feedback compensating dq-control voltage. The d- and q-axis error signals can be a difference between the d- and q-axis currents and reference d- and q-axis currents, respectively. The method can further include outputting a compensating dq-control voltage from the current-loop neural network and controlling the PWM converter using the compensating dq-control voltage.

22 Claims, 11 Drawing Sheets

(56) References Cited

U.S. PATENT DOCUMENTS

| | | | | |
|---|---|---|---|---|
| 2008/0315811 | A1* | 12/2008 | Hudson | H02P 23/0077 318/400.34 |
| 2011/0006711 | A1* | 1/2011 | Imura | H02P 6/08 318/400.07 |
| 2011/0031907 | A1* | 2/2011 | Takahashi | H02P 21/141 318/139 |
| 2014/0362617 | A1* | 12/2014 | Li | H02J 3/00 363/34 |

OTHER PUBLICATIONS

Bishop, C.M., "Neural Networks for Pattern Recognition," Oxford University Press, 1995, 495 pages (submitted as two documents—Part 1 and Part 2).

Carrasco, J.M., et al., "Power-Electronic Systems for the Grid Integration of Renewable Energy Sources: A Survey," IEEE Transactions on Industrial Electronics, vol. 53, No. 4, 2006, pp. 1002-1016.

Chan, C.C., "The State of the Art of Electric and Hybrid Vehicles," Proceedings of the IEEE, vol. 90, No. 2. 2002, pp. 224-279.

Dannehi, J., et al., "Limitations of Voltage-Oriented PI Current Control of Grid-Connected PWM Rectifiers with LCL Filters," IEEE Transactions on Industrial Electronics, vol. 56, No. 2, 2009, pp. 380-388.

Fairbank, M., et al., "An Adaptive Recurrent Neural Network Controller using a Stabilization Matrix and Predictive Inputs to Solve the Tracking Problem under Disturbances," Neural Networks, vol. 49, 2013, 35 pages.

Fairbank, M., et al., "The Divergence of Reinforcement Learning Algorithms with Value-Iteration and Function Approximation," Proceedings of the IEEE International Joint Conference on Neural Networks (IJCNN'12), IEEE Press, 2012, pp. 3070-3077.

Feldkamp, L.A., et al., "A Signal Processing Framework Based on Dynamic Neural Networks with Application to Problems in Adaptation, Filtering, and Classification," Proceedings of the IEEE, vol. 86, No. 11, 1998, pp. 2259-2277.

Figueres, E., et al., "Sensitivity Study of the Dynamics of Three-Phase Photovoltaic Inverters with an LCL Grid Filter," IEEE Transactions on Industrial Electronics, vol. 56, No. 3, 2009, pp. 706-717.

Hochreiter, S., et al., "Long Short-Term Memory," Neural Computation, vol. 9, No. 8, 1997, pp. 1735-1780.

Kirk, D.E., "Optimal Control Theory: An Introduction," Chapters 1-3, Prentice-Hall, Englewood Cliffs, NJ, 1970, 471 pages.

Li, S., et al., "Control of HVDC Light System Using Conventional and Direct Current Vector Control Approaches," IEEE Transactions on Power Electronics, vol. 25, No. 12, 2010, pp. 3106-3118.

Li, S., et al., "Conventional and Novel Control Designs for Direct Driven PMSG Wind Turbines," Electric Power System Research, vol. 80, Issue 3, 2010, pp. 328-338.

Li, S., et al., "Direct-current Vector Control of Three-Phase Grid-Connected Rectifier-Inverter," Electric Power Systems Research, vol. 81, No. 2, 2011, pp. 357-366.

Li, S., et al., "Nested-Loop Neural Network Vector Control of Permanent Magnet Synchronous Motors," The 2013 International Joint Conference on Neural Network, Dallas, Texas, 2013, 8 pages.

Li, Y., et al., "The Comparison of Control Strategies for the Interior PMSM Drive used in the Electric Vehicle," The 25th World Battery, Hybrid and Fuel Cell Electric Vehicle Symposium & Exhibition, Shenzhen, China, 2010, 6 pages.

Li, S., et al. "Vector Control of a Grid-Connected Rectifier/Inverter Using an Artificial Neural Network," Proceedings of the IEE International Joint Conference on Neural Netowrks (IJCNN'12), IEEE World Congress on Computational Intelligence, Brisbane, Australia, 2012, pp. 1783-1789.

Luo, A., et al., "Fuzzy-PI-Based Direct-Output-Voltage Control Strategy for the STATCOM Used in Utility Distribution Systems," IEEE Transactions on Industrial Electronics, vol. 56, No. 7, 2009, pp. 2401-2411.

Mullane, A., et al., "Wind-Turbine Fault Ride-Through Enhancement," IEEE Transactions on Power Systems, vol. 20, No. 4, 2005, pp. 1929-1937.

Park, J-W., et al., "New External Neuro-Controller for Series Capacitive Reactance Compensator in a Power Network," IEEE Transactions on Power Systems, vol. 19, No. 3, 2004, pp. 1462-1472.

Pena, R., et al., "Doubly fed induction generator using back-to-back PWM converters and its application to variable-speed wind-energy generation," Electric Power Applications, IEEE Proceedings, vol. 143, Issue 3, 1996, pp. 231-241.

Prokhorov, D.V., et al., "Adaptive Behavior with Fixed Weights in RNNs: An Overview," Proceedings of the 2002 International Joint Conference on Neural Networks, (IJCNN'02), vol. 3, IEEE Press, 2002, pp. 2018-2022.

Prokhorov, D., et al., "Adaptive Critic Designs," IEEE Transactions on Neural Networks, vol. 8, No. 5, 1997, pp. 997-1007.

Qiao, W., et al., "Coordinated Reactive Power Control of a Large Wind Farm and a STATCOM Using Heuristic Dynamic Programming," IEEE Transactions on Energy Conversion, vol. 24, No. 2, 2009, pp. 493-503.

Qiao, W., et al., "Fault-Tolerant Optimal Neurocontrol for a Static Synchronous Series Compensator Connected to a Power Network," IEEE Transactions on Industry Applications, vol. 44, No. 1, 2008, pp. 74-84.

Qiao, W., et al., "Optimal Wide-Area Monitoring and Nonlinear Adaptive Coordinating Neurocontrol of a Power System with Wind Power Integration and Multiple FACTS Devices," Neural Networks, vol. 21, No. 2, 2008, pp. 466-475.

Qiao, W., et al., "Real-Time implementation of a STATCOM on a Wind Farm Equipped With Doubly Fed Induction Generators," IEEE Transactions on Industry Applications, vol. 45, No. 1, 2009, pp. 98-107.

Rabelo, B.C., et al., "Reactive Power Control Design in Double Fed Induction Generators for Wind Turbines," IEEE Transactions on Industrial Electronics, vol. 56, No. 10, 2009, pp. 4154-4162.

Riedmiller, M., "A Direct Adaptive Method for Faster Backpropagation Learning: The RPROP Algorithm," Proceedings of the IEEE International Conference on Neural Networks, San Francisco, CA, 1993, pp. 586-591.

Venayagamoorthy, G.K., et al., "Comparison of Heuristic Dynamic Programming and Dual Heuristic Programming Adaptive Critics for Neurocontrol of a Turbogenerator," IEEE Transactions on Neural Networks, vol. 13, No. 3, 2002, pp. 764-773.

Venayagamoorthy, G.K., et al., "Implementation of Adaptive Critic-Based Neurocontrollers for Turbogenerators in a Multimachine Power System," IEEE Transactions on Neural Networks, vol. 14, No. 5, 2003, pp. 1047-1064.

Wang, C., et al., "Short-Time Overloading Capability and Distributed Generation Applications of Solid Oxide Fuel Cells," IEEE Transactions on Energy Conversion, vol. 22, No. 4, 2007, pp. 898-906.

Wang, F-Y., et al., "Adaptive Dynamic Programming: An Introduction," IEEE Computational Intelligence Magazine, vol. 43, No. 2, 2009, pp. 39-47.

Werbos, P.J., "Backpropagation Through Time: What it Does and How to Do it," Proceedings of the IEEE, vol. 78, No. 10, 1990, pp. 1550-1560.

Werbos, P.J., "Backwards Differentiation in AD and Neural Nets: Past Links and New Opportunities," Automatic Differention: Applications, Theory and Implementations, Bücker, H., et al., Lecture Notes in Computational Science and Engineering, Springer, 2005, pp. 15-34.

Werbos, P.J., "Neural Networks, System Identification, and Control in the Chemical Process Industries," Handbook of Intelligence Control, Chapter 10, Section 10.6.1-10.6.2, White, Sofge, eds., New York, Van Nostrant Reinhold, New York, 1992, pp. 283-356, www.werbos.com.

Werbos, P.J., "Stable Adaptive Control Using New Critic Designs," eprint arXiv:adap-org/9810001, Sections 77-78, 1998.

(56) References Cited

OTHER PUBLICATIONS

Werbos, P.J., "Approximate Dynamic Programming for Real-Time Control and Neural Modeling," Handbook of Intelligent Control, Chapter 13, White, Sofge, eds.,New York, Van Nostrand Reinhold, 1992, pp. 493-525.
Xu, L., et al., "Dynamic Modeling and Control of DFIG-Based Wind Turbines Under Unbalanced Network Conditions," IEEE Transactions on Power Systems, vol. 22, No. 1, 2007, pp. 314-323.
International Search Report, dated Nov. 6, 2014, in corresponding International Application No. PCT/US2014/049724.

* cited by examiner

SYSTEMS, METHODS AND DEVICES FOR VECTOR CONTROL OF PERMANENT MAGNET SYNCHRONOUS MACHINES USING ARTIFICIAL NEURAL NETWORKS

PRIORITY

This application claims priority to U.S. Provisional Patent Application No. 61/862,277 filed on Aug. 5, 2013, which is fully incorporated by reference and made a part hereof.

STATEMENT REGARDING FEDERALLY FUNDED RESEARCH

This invention was made with Government support under Grant Nos. ECCS 1102038 and ECCS 1102159 awarded by the National Science Foundation. The Government has certain rights in the invention.

BACKGROUND

AC electrical machines are used in a large number of applications including, but not limited to, factory automation, wind turbines and electric drive vehicles. Typical AC electric machines include induction machines and synchronous machines. FIG. 1 is a schematic diagram illustrating a permanent magnet synchronous generator ("PMSG") wind turbine. A PMSG is a form of a permanent magnet synchronous machine ("PMSM"). In FIG. 1, the PMSG 101 stator winding is connected to an electrical grid 103 through a frequency converter 102 (e.g., in this instance a pulse width modulated ("PWM") converter). The frequency converter 102 can include two self-commutated PWM converters 102A and 102B, i.e., machine-side converter 102A and grid-side converter 102B, with an intermediate DC voltage link 102C. The DC voltage link 102C (e.g., a capacitor) decouples the operation of the two PWM converters, thus allowing their control and operation to be optimized. The control objectives of the machine-side converter 102A include 1) maximum energy extraction from the wind, and 2) management of PMSG energy generation in compliance with grid demands.

The performance of an AC electric machine depends on how it is controlled. Conventionally, vector control technologies have been used to control AC electric machines based on proportional-integral-derivative ("PID") control technology. Recent studies, however, indicate that such control strategies have limitations, particularly when facing uncertainties.

Referring now to FIG. 2, a schematic diagram illustrates another type of PMSM, one used in an electric drive vehicle ("EDV"). In FIG. 2, the PMSM 201 is connected to battery 203 (e.g., a power source) through a frequency converter 202 (e.g., a PWM converter). Similar to the PMSG, the control design of PMSM is primarily model based and/or uses PID control technology, which may be inefficient, unstable and unreliable especially under variable and complex system conditions.

Therefore, what are needed are improved control systems for controlling PMSMs. In particular, systems, methods and devices are desired for controlling PMSMs under unstable and uncertain system conditions.

SUMMARY

Methods, systems and devices are described herein that use artificial neural networks to control AC electric machines and motor drives, which enhances the performance, reliability and efficiency of the AC electric machines and motor drives.

An example method for controlling an AC electrical machine can include providing a PWM converter operably connected between an electrical power source and the AC electrical machine and providing a neural network vector control system operably connected to the PWM converter. The neural network vector control system can include a current-loop neural network configured to receive a plurality of inputs. The current-loop neural network can be configured to optimize a compensating dq-control voltage based on the plurality of inputs. The plurality of inputs can be a d-axis current, $i_{sd}$, a q-axis current, $i_{sq}$, a d-axis error signal, a q-axis error signal, a predicted d-axis current signal, a predicted q-axis current signal and a feedback compensating dq-control voltage. The d-axis error signal can be a difference between $i_{sd}$ and a reference d-axis current, $i_{sd}$*, and the q-axis error signal can be a difference between $i_{sq}$ and a reference q-axis current, $i_{sq}$*. The method can further include outputting a compensating dq-control voltage from the current-loop neural network and controlling the PWM converter using the compensating dq-control voltage.

Optionally, a predicted d-axis current signal can be a difference between $i_{sd}$ and a predicted d-axis current, $i_{sd}'$, and a predicted q-axis current signal can be a difference between $i_{sq}$ and a predicted q-axis current, $i_{sq}'$. The predicted d- and q-axis current signals, $i_{sd}'$ and $i_{sq}'$, can be computed using a current prediction model. For example, the current prediction model can be based on $i_{sd}$, $i_{sq}$ and the compensating dq-control voltage at a previous time step and default parameters for the AC electrical machine.

Additionally, the compensating dq-control voltage can optionally be adjusted by a stabilization matrix that is based on default parameters for the AC electrical machine.

Alternatively or additionally, the plurality of inputs at the current-loop neural network can further include an integral of the d-axis error signal and an integral of the q-axis error signal.

Optionally, the neural network vector control system can further include a speed-loop neural network configured to receive a plurality of inputs. The speed-loop neural network can be configured to optimize a drive torque signal based on the plurality of inputs. The plurality of inputs can be a speed of the AC electrical machine, $\omega_m$, a speed error signal, a predicted speed signal and a feedback drive torque signal. The speed error signal can be a difference between $\omega_m$ and a reference speed, $\omega_m$*. The method can further include outputting a drive torque signal, $\tau_{em}$, from the speed-loop neural network. Additionally, the drive torque signal, $\tau_{em}$, can be converted into the reference q-axis current, $i_{sq}$*.

The predicted speed signal can optionally be a difference between $\omega_m$ and a predicted speed signal, $\omega_m'$, where $\omega_m'$ is computed using a speed prediction model. For example, the speed prediction model can be based on $\omega_m$ and $\tau_{em}$ at a previous time step and default parameters for the AC electrical machine.

Alternatively or additionally, the drive torque signal, $\tau_{em}$, can optionally be adjusted by a drive-torque stabilization matrix that is based on default parameters for the AC electrical machine.

Optionally, the plurality of inputs at the speed-loop neural network can further include an integral of the speed error signal.

Optionally, at least one of the current-loop neural network and the speed-loop neural network can be configured to implement a dynamic programming ("DP") algorithm.

Additionally, at least one of the current-loop network and the speed-loop neural network can be trained to minimize a cost function of a dynamic programming ("DP") algorithm using a backpropagation through time ("BPTT") algorithm. For example, at least one of the current-loop neural network and the speed-loop neural network can be trained by randomly generating an initial state, randomly generating a sample reference state, unrolling a trajectory of the neural network vector control system from the initial state and training the current-loop neural network or the speed-loop neural network based on the cost function of the DP algorithm and the BPTT algorithm.

Additionally, at least one of the current-loop neural network and the speed-loop neural network can optionally be a multi-layer perceptron including a plurality of input nodes, a plurality of hidden layer nodes and a plurality of output nodes. Alternatively or additionally, each of the nodes can be configured to implement a hyperbolic tangent function.

Optionally, the AC electrical machine is a permanent magnet synchronous machine or an induction machine.

An example system for controlling an AC electrical machine can include a PWM converter operably connected between an electrical power source and the AC electrical machine and a neural network vector control system operably connected to the PWM converter. The neural network vector control system can include a current-loop neural network configured to receive a plurality of inputs. The current-loop neural network can be configured to optimize a compensating dq-control voltage based on the plurality of inputs. The plurality of inputs can be a d-axis current, $i_{sd}$, a q-axis current, $i_{sq}$, a d-axis error signal, a q-axis error signal, a predicted d-axis current signal, a predicted q-axis current signal and a feedback compensating dq-control voltage. The d-axis error signal can be a difference between $i_{sd}$ and a reference d-axis current, $i_{sd}*$, and the q-axis error signal can be a difference between $i_{sq}$ and a reference q-axis current, $i_{sq}*$. The current-loop neural network can output a compensating dq-control voltage. The neural network vector control system can control the PWM converter using the compensating dq-control voltage.

Optionally, a predicted d-axis current signal can be a difference between $i_{sd}$ and a predicted d-axis current, $i_{sd}'$, and a predicted q-axis current signal can be a difference between $i_{sq}$ and a predicted q-axis current, $i_{sq}'$. The predicted d- and q-axis current signals, $i_{sd}'$ and $i_{sq}'$, can be computed using a current prediction model. For example, the current prediction model can be based on $i_{sd}$, $i_{sq}$ and the compensating dq-control voltage at a previous time step and default parameters for the AC electrical machine.

Additionally, the compensating dq-control voltage can optionally be adjusted by a stabilization matrix that is based on default parameters for the AC electrical machine.

Alternatively or additionally, the plurality of inputs at the current-loop neural network can further include an integral of the d-axis error signal and an integral of the q-axis error signal.

Optionally, the neural network vector control system can further include a speed-loop neural network configured to receive a plurality of inputs. The speed-loop neural network can be configured to optimize a drive torque signal based on the plurality of inputs. The plurality of inputs can be a speed of the AC electrical machine, $\omega_m$, a speed error signal, a predicted speed signal and a feedback drive torque signal. The speed error signal can be a difference between $\omega_m$ and a reference speed, $\omega_m*$. The speed-loop neural network can output a drive torque signal, $\tau_{em}$. Additionally, the drive torque signal, $\tau_{em}$, can be converted into the reference q-axis current, $i_{sq}*$.

The predicted speed signal can optionally be a difference between $\omega_m$ and a predicted speed signal, $\omega_m'$, where $\omega_m'$ is computed using a speed prediction model. For example, the speed prediction model can be based on $\omega_m$ and $\tau_{em}$ at a previous time step and default parameters for the AC electrical machine.

Alternatively or additionally, the drive torque signal, $\tau_{em}$, can optionally be adjusted by a drive-torque stabilization matrix that is based on default parameters for the AC electrical machine.

Optionally, the plurality of inputs at the speed-loop neural network can further include an integral of the speed error signal.

Optionally, at least one of the current-loop neural network and the speed-loop neural network can be configured to implement a DP algorithm.

Additionally, at least one of the current-loop neural network and the speed-loop neural network can be trained to minimize a cost function of the DP algorithm using a BPTT algorithm. For example, at least one of the current-loop neural network and the speed-loop neural network can be trained by randomly generating an initial state, randomly generating a sample reference state, unrolling a trajectory of the neural network vector control system from the initial state and training the current-loop neural network or the speed-loop neural network based on the cost function of the DP algorithm and the BPTT algorithm.

Additionally, at least one of the current-loop neural network and the speed-loop neural network can optionally be a multi-layer perceptron including a plurality of input nodes, a plurality of hidden layer nodes and a plurality of output nodes. Alternatively or additionally, each of the nodes can be configured to implement a hyperbolic tangent function.

Optionally, the AC electrical machine is a permanent magnet synchronous machine or an induction machine.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for controlling PMSMs used in electric drive vehicles, it will become evident to those skilled in the art that the implementations are not limited thereto, but are applicable for controlling other types of AC electrical machines, including but not limited to, PMSMs used in other environments, induction machines used for factory automation and wind turbines connected to the power grid.

Figure 1:
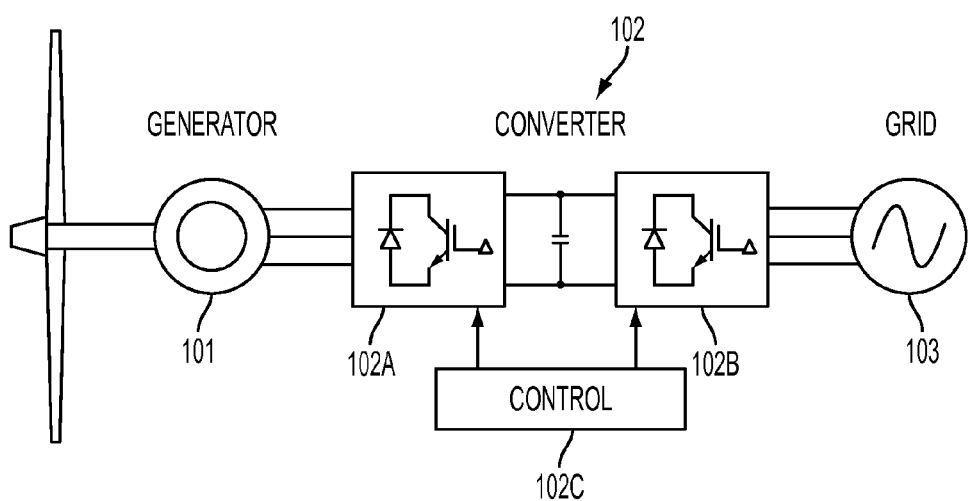
FIG. 1 is a schematic diagram illustrating a PMSG wind turbine.
Figure 2:
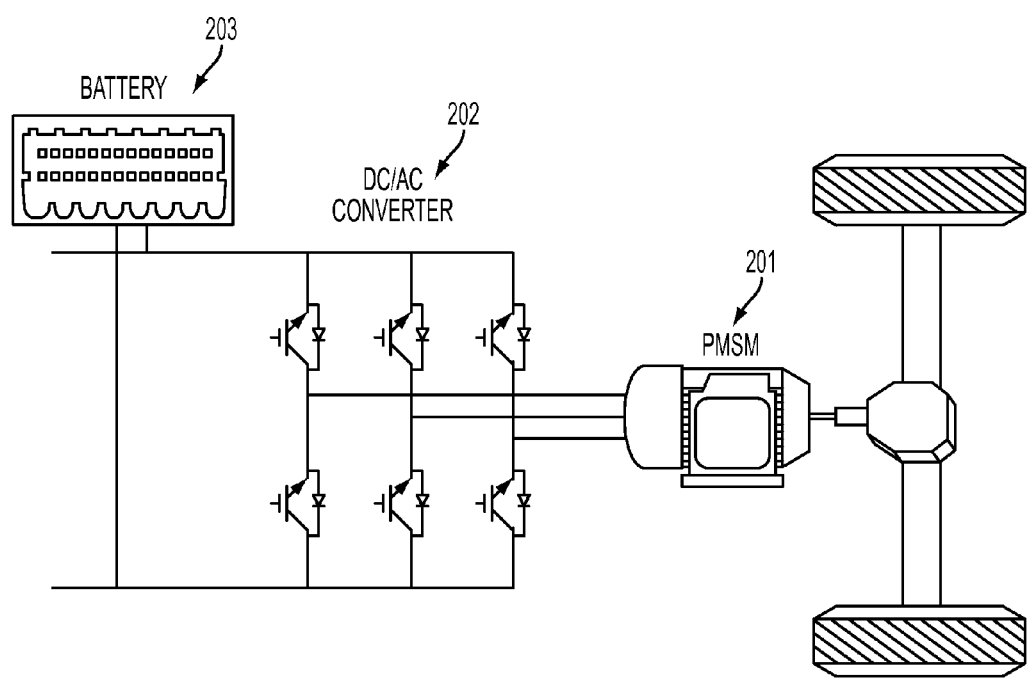
FIG. 2 is a schematic diagram illustrating a PMSM in an electric drive vehicle.
Figure 3:
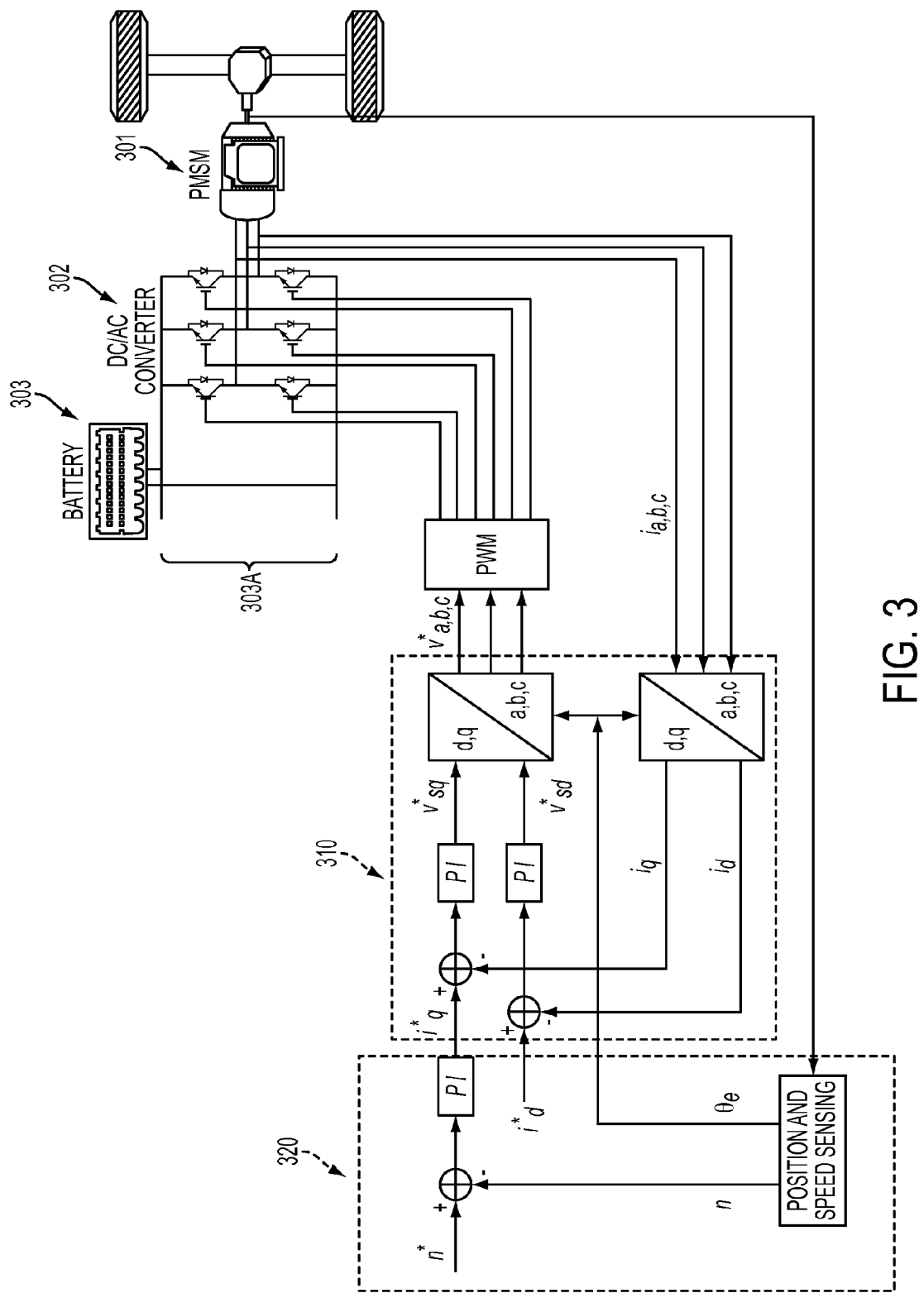
FIG. 3 is a schematic diagram illustrating a PMSM with a nested-loop PI control structure.

Referring now to FIG. 3, a schematic diagram illustrating a PMSM with a nested-loop control structure is shown. The PMSM in FIG. 3 is used in an EDV. A PMSM is an AC electric motor that uses permanent magnets to produce the air gap magnetic field rather than using electromagnets. In a PMSM, the rotor is driven by the stator, via a synchronous rotational field generated by the three-phase currents passing through the stator windings. In EDV applications, the stator windings of a PMSM 301 are connected to a DC bus 303A, which is connected to a battery 303, through a standard three-leg voltage-source PWM converter 302. The PWM converter 302 converts DC voltage to three-phase AC voltage in the PMSM drive mode or converts three-phase AC voltage to DC voltage in the regenerating mode. In the drive mode, power flows from the DC bus 303A to the PMSM 301 to drive the vehicle, while in the regenerating mode, power flows from the PMSM 301 to the DC bus 303A to charge the battery 303.

In FIG. 3, conventional standard vector control techniques are used. For example, the control structure is a nested-loop having of a faster inner current loop 310 and a slower outer speed loop 320. The speed reference (e.g., n*)) is generated during the operation of the EDV. The speed and magnetic field control is converted into decoupled d-q current control (e.g., a q-axis reference signal, $i_q^*$). The faster inner current loop 310 implements the final control function by applying a stator voltage control signal (e.g., $v^*_{a,b,c}$) to the PWM converter 302 to realize the variable-speed operation of the EDV.

Figure 4:
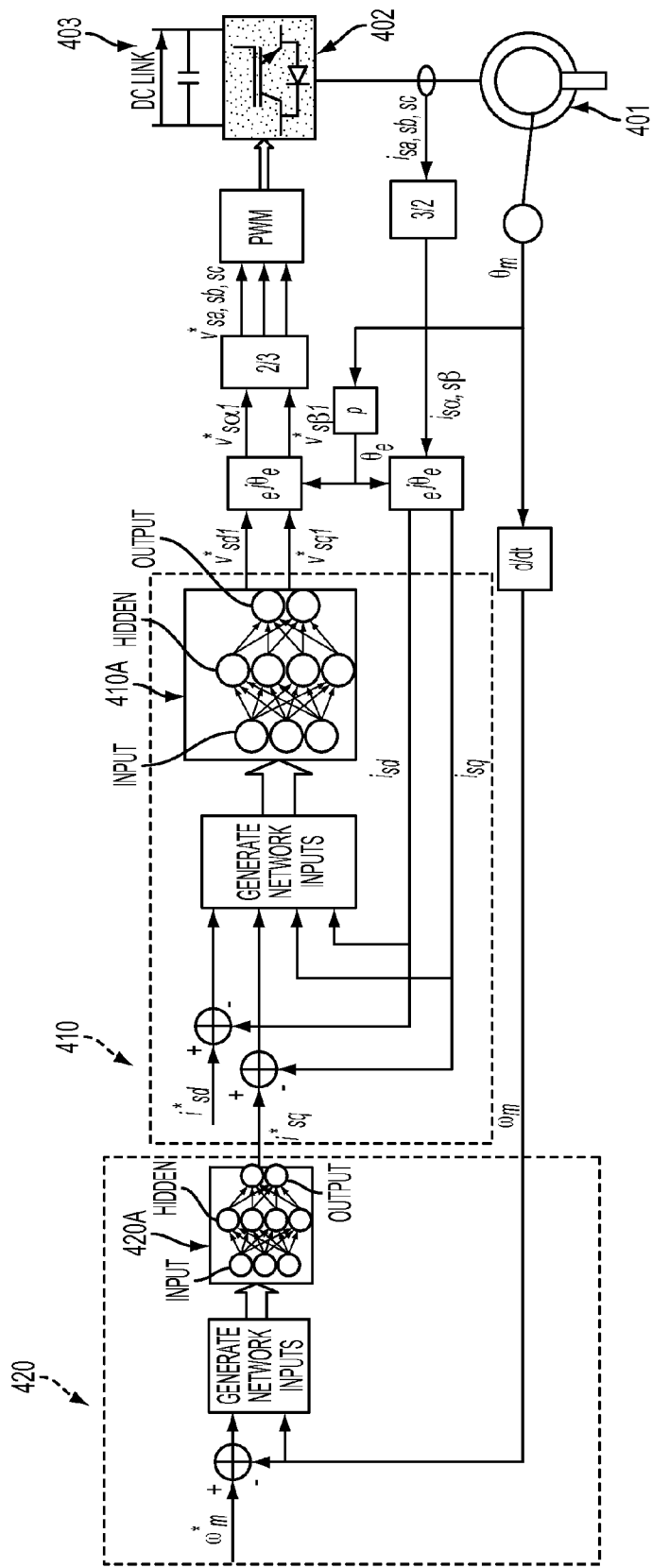
FIG. 4 is a schematic diagram illustrating a PMSM with a nested-loop neural network vector control structure.

Referring now to FIG. 4, a schematic diagram illustrating a PMSM in an EDV with a neural network vector control structure is shown. The PMSM in FIG. 4 can be used in an EDV. Similar to FIG. 3, a PMSM 401 (e.g., an AC electrical machine) is connected to an electrical power source 403 (e.g., a DC bus, a DC power source, a battery, etc.) through a DC/AC converter 402. The DC/AC converter 402 (e.g., a PWM converter) converts DC voltage to three-phase AC voltage in the PMSM drive mode or converts three-phase AC voltage to DC voltage in the regenerating mode. In FIG. 4, the neural network vector control system includes a faster inner current-loop neural network controller 410 (e.g., including current-loop neural network 410A) and a slower outer speed-loop neural network controller 420 (e.g., including speed-loop neural network 420A). It should be understood that the current-loop neural network controller 410 is important for high power quality of the PMSM 401 in terms of harmonics and unbalance. Of the two nested-loop neural network controllers, the current-loop neural network controller 410 is more critical due to the limitations of the conventional current-loop PI controller discussed above.

A neural network implements the optimal control principle through a dynamic programming ("DP") algorithm. Therefore, using a neural network is completely different than using the conventional vector control techniques described above. Compared to conventional vector control techniques, the neural network vector control approach produces faster response time, lower overshoot, and, in general, better performance. In addition, since a neural network is trained under variable system parameters, the nested-loop neural network vector control system of FIG. 4 has more attractive performance when the system parameters are difficult to identify.

A commonly used PMSM transient model is described by Eqn. (1). Using the motor sign convention, space vector theory yields the stator voltage equation in the form:

$$\begin{pmatrix} v_{sd} \\ v_{sq} \end{pmatrix} = R_s \begin{pmatrix} i_{sd} \\ i_{sq} \end{pmatrix} + \frac{d}{dt}\begin{pmatrix} \psi_{sd} \\ \psi_{sq} \end{pmatrix} + \omega_e \begin{pmatrix} 0 & -1 \\ 1 & 0 \end{pmatrix}\begin{pmatrix} \psi_{sd} \\ \psi_{sq} \end{pmatrix} \quad (1)$$

where $R_s$ is the resistance of the stator winding, $\omega_e$ is the rotational speed of the PMSM, and $v_{sd}$, $v_{sq}$, $i_{sd}$, $i_{sq}$, $\psi_{sd}$, and $\psi_{sq}$ are the d and q components of instant stator voltage, current, and flux. If the d-axis is aligned along the rotor flux position, the stator flux linkages are defined by Eqn. (2).

$$\begin{pmatrix} \psi_{sd} \\ \psi_{sq} \end{pmatrix} = \begin{pmatrix} L_{ls} + L_{dm} & 0 \\ 0 & L_{ls} + L_{qm} \end{pmatrix}\begin{pmatrix} i_{sd} \\ i_{sq} \end{pmatrix} + \begin{pmatrix} \psi_f \\ 0 \end{pmatrix} \quad (2)$$

where $L_{ls}$ is the leakage inductance, $L_{dm}$ and $L_{qm}$ are the stator and rotor d- and q-axis mutual inductances, $\psi_f$ is the flux linkage produced by the permanent magnet. Under the steady-state condition, Eqn. (1) is expressed as Eqn. (3).

$$\begin{pmatrix} V_{sd} \\ V_{sq} \end{pmatrix} = \begin{pmatrix} R_s & -\omega_e L_q \\ \omega_e L_d & R_s \end{pmatrix}\begin{pmatrix} I_{sd} \\ I_{sq} \end{pmatrix} + \begin{pmatrix} 0 \\ \omega_e \psi_f \end{pmatrix} \quad (3)$$

If stator winding resistance is neglected, the stator d and q-axis currents are defined by Eqn. (4).

$$I_{sq} = -V_{sd}/(\omega_e L_q), \quad I_{sd} = (V_{sq} - \omega_e \psi_f)/(\omega_e L_d) \quad (4)$$

The magnets can be placed in two different ways on the rotor of a permanent magnet ("PM") motor (e.g., a PMSM). Depending on the placement, the PM motors are called either Surface Permanent Magnet ("SPM") motors or Interior Permanent Magnet ("IPM") motors. An IPM motor is considered to have saliency with q axis inductance greater than the d axis inductance ($L_q > L_d$), while an SPM motor is considered to have small saliency, thus having practically equal inductances in both d- and q-axes ($L_q = L_d$). The torque of the PM motor is calculated by Eqn. (5) for a SPM motor and by Eqn. (6) for a IPM motor.

$$\tau_{em} = p\psi_f i_{sq} \quad \text{SPM motor} \quad (5)$$

$$\tau_{em} = p(\psi_f i_{aq} + (L_d - L_q) i_{ad} i_{aq}) \quad \text{IPM Motor} \quad (6)$$

where p is pole pairs. If the torque computed from Eqn. (5) or (6) is positive, the motor operates in the drive mode. If the torque computed from Eqn. (5) or (6) is negative, the motor operates in the regenerate mode.

In an EDV, the motor produces an electromagnetic torque. The bearing friction and wind resistance (e.g., drag) can be combined with the load torque opposing the rotation of the PM motor. The net torque, e.g., the difference between the electromagnetic torque $\tau_{em}$ developed by the motor and the load torque $T_L$, causes the combined inertias $J_{eq}$ of the motor and the load to accelerate. Thus, the rotational speed of the PM motor is defined by Eqn. (7).

$$\tau_{em} = J_{eq} d\omega_m/dt + B_a \omega_m + T_L \quad (7)$$

where $\omega_m$ is the motor rotational speed, and $B_a$ is the active damping coefficient. The relation between $\omega_m$ and $\omega_e$ is defined below, where p is motor pole pairs.

$$\omega_e = p \cdot \omega_m$$

PMSM Nested-Loop Vector Control Using Artificial Neural Networks

Current-Loop Neural Network Vector Control

Referring again to FIG. 4, to develop a current-loop neural network controller 410, the PMSM model of Eqn. (1) is rearranged into the standard state-space form as shown by Eqn. (8), where the system states are $i_{sd}$ and $i_{sq}$, permanent magnet flux $\psi_f$ is assumed constant, and converter output voltages $v_{sd}$ and $v_{sq}$ are proportional to the control voltage of the current-loop neural network 410A.

$$\frac{d}{dt}\begin{pmatrix} i_{sd} \\ i_{sq} \end{pmatrix} = -\begin{pmatrix} \frac{R_s}{L_d} & -\frac{\omega_e L_q}{L_d} \\ \omega_e \frac{L_d}{L_q} & \frac{R_s}{L_q} \end{pmatrix}\begin{pmatrix} i_{sd} \\ i_{sq} \end{pmatrix} + \begin{pmatrix} \frac{v_{sd}}{L_d} \\ \frac{v_{sq}}{L_q} - \frac{\omega_e \psi_f}{L_q} \end{pmatrix} \quad (8)$$

For digital control implementations, the discrete equivalent of the continuous system state-space model can be obtained as shown by Eqn. (9).

$$\begin{pmatrix} i_{sd}(kT_s + T_s) \\ i_{sq}(kT_s + T_s) \end{pmatrix} = A\begin{pmatrix} i_{sd}(kT_s) \\ i_{sq}(kT_s) \end{pmatrix} + B\begin{pmatrix} v_{sd}(kT_s) - 0 \\ v_{sq}(kT_s) - \omega_e \psi_f \end{pmatrix} \quad (9)$$

where $T_s$ represents the sampling period, A is the system matrix, and B is the input matrix. A zero-order-hold discrete equivalent mechanism is used herein to convert the continuous state-space model of the system shown by Eqn. (8) to the discrete state-space model of the system as shown by Eqn. (9). $T_s = 1$ ms has been used in all examples provided herein. This disclosure contemplates using other values for $T_s$.

The current-loop neural network 410A, also referred to herein as the current-loop action network, is applied to the DC/AC converter 402 through a PWM mechanism to regulate the inverter output voltage $v_{sa,sb,sc}$ applied to the PMSM stator. The current-loop action network, which can be denoted by the function $A(\vec{x}(k)\vec{w})$, is a fully connected multi-layer perceptron with weight vector $\vec{w}$, an input layer with a plurality of input nodes, a plurality of hidden layers with a plurality of hidden layer nodes and an output layer with a plurality of output nodes. The multi-layer perceptron can have shortcut connections between all pairs of layers. Optionally, the multi-layer perceptron includes at least six input nodes, two hidden layers of six hidden layer nodes each and two output nodes. Alternatively or additionally, each of the nodes can be configured to implement a hyperbolic tangent function. It should be understood that the multi-layer perceptron can include the number of input nodes, hidden layer nodes and output nodes needed to implement the control techniques described herein.

The input vector to the current-loop action network is denoted by $\vec{x}(k) = \vec{i}_{sdq}(k), \vec{i}_{sdq}^*(k) - \vec{i}_{sdq}(k), \vec{i}_{sdq}(k) - \hat{i}_{sdq}(k), A(\vec{x}(k-1), \vec{w}))$. The current-loop action network can be configured to optimize a compensating dq-control voltage based on the plurality of inputs. The four components or inputs of $\vec{x}(k)$ correspond, respectively, to (1) presently measured PMSM stator B- and q-axis currents (e.g., d-axis current, $i_{sd}$, and q-axis current, $i_{sq}$), (2) error signals of the d- and q-axis currents (e.g., d-axis error signal and q-axis error signal), (3) predictive input signals (e.g., predicted d-axis current signal and predicted q-axis current signal), and (4) history of the current-loop action network output from a previous time step (e.g., feedback compensating dq-control voltage). The d-axis error signal can be a difference between $i_{sd}$ and a reference d-axis current, $i_{sd}^*$, and the q-axis error signal can be a difference between $i_{sq}$ and a reference q-axis current, $i_{sq}^*$.

In the above input vector, $\hat{i}(k)$ is the predicted current state vector (e.g., the B- and q-axis current signals or the predictive input signals), which can be calculated with a fixed model shown in Eqn. (10).

$$\hat{i}_{sdq}(k) = A_0 \cdot \vec{i}_{sdq}(k-1) + B_0 \cdot (\vec{v}_{sdq}(k-1) - \vec{e}_{dq}) \quad (10)$$

where $A_0$ and $B_0$ are constant matrices of Eqn. (9) chosen for the default nominal parameters of the AC electrical machine (e.g., PMSM 401). In other words, the predicted d- and q-axis current signals, $i_{sd}'$ and $i_{sq}'$, can be computed using a current prediction model. The current prediction model can be based on $i_{sd}$, $i_{sq}$ and the compensating dq-control voltage at a previous time step and default parameters for the AC electrical machine as shown in Eqn. (10). In addition, the predicted d-axis current signal can be a difference between $i_{sd}$ and a predicted d-axis current, $i_{sd}'$, and a predicted q-axis current signal can be a difference between $i_{sq}$ and a predicted q-axis current, $i_{sq}'$. Hence the third component of $\vec{x}(k)$, i.e., $\vec{i}_{sdq}(k) - \hat{i}_{sdq}(k)$, gives the current-loop action network information on how much the current matrices A and B differ from the default parameters $A_0$ and $B_0$. This information allows the current-loop action network to adapt in real time to changing A and B matrices. When the predictive input signals are provided to the current-loop action network, it is more powerful than the conventional model-based predictive control due to the advantage obtained through learning. In addition, $A(\vec{x}(k-1),\vec{w})$ is the output of the current-loop action network at a previous time step (e.g., feedback compensating dq-control voltage). This input helps the current-loop action network adapt in real time to changing A and B matrices since it gives feedback on what relative adjustments need making to the previous action which was attempted.

Optionally, the input vector, $\hat{i}_{dq}(k)$, to the current-loop neural network can further include an integral of the d-axis error signal and an integral of the q-axis error signal. The integrals of the d-axis and the q-axis error signals can provide the current-loop action neural network with a history of the d-axis and q-axis error signals, respectively. The integral terms provide a history of all past errors by summing errors together. For example, if there is an error in a given time step, the error is added to the integral term for the next time step. Thus, the integral term will only stay the same as it was at a previous time step if there is no error in a current time step, which prevents the action neural network from stabilizing at a non-target value. This helps to minimize steady state errors.

To simplify the expressions, the discrete system model Eq. (9) is represented by Eqn. (11).

$$\vec{i}_{sdq}(k+1)=A\cdot\vec{i}_{sdq}(k)+B\cdot(\vec{v}_{sdq}(k)-\vec{e}_{dq}) \quad (11)$$

where $\vec{e}_{dq}(0\ \omega_e\psi_f)^T\cdot\vec{v}_{sdq}(k)$ is the control vector, which is determined from the output of the current-loop action network, $A(\vec{x}(k)\vec{\omega})$ as shown by Eqn. (12).

$$\vec{v}_{sdq}(k)=k_{PWM}\cdot A(\vec{x}(k)\vec{w})+W_0\vec{i}_{sdq}(k)+\vec{e}_{aq} \quad (12)$$

where $W_0=B_0^{-1}(A_0-I)$ is a constant referred to herein as a stabilization matrix. As discussed herein, the stabilization matrix refers to both $W_0$ and $\vec{e}_{dq}$ terms in Eqn. (12), which are added to $A(\vec{x}(k-1),\vec{w})$. The stabilization matrix acts like an extra weight matrix in the current-loop action network that connects the input layer directly to the output layer. In other words, the compensating dq-control voltage (e.g., the output of the current-loop action network) can optionally be adjusted by the stabilization matrix, which is based on default parameters for the AC electrical machine (e.g., PMSM 401). This provides the current-loop action network with some basic default behavior of being able to hold the system steady more easily. The stabilization matrix also removes many of the local minima from the search space that are classically associated with gradient-descent algorithms applied to recurrent neural networks.

Figure 5A:
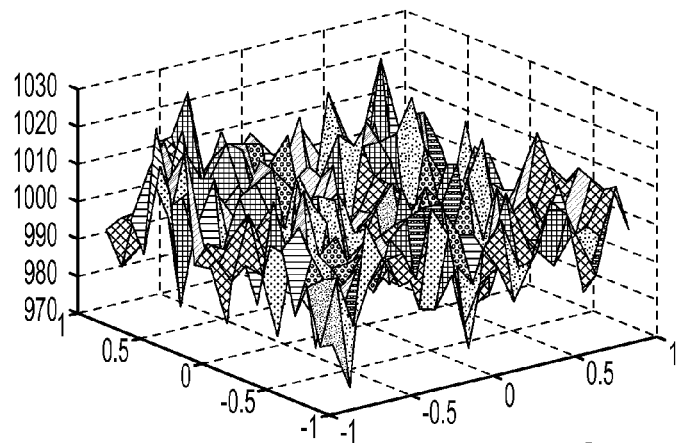
FIGS. 5A-5B are graphs illustrating example error surfaces encountered according to techniques described herein.

It should be understood that training the current-loop action network (discussed in detail below) can be difficult because every time a component of the weight vector $\vec{w}$ changes, the actions chosen by Eqn. (12) change at every time step. Each changed action will consequently change the next state that the system passes through as shown by Eqn. (11). And each changed state will further change the next action chosen by Eqn. (12). This creates an ongoing cascade of changes. Hence changing even one component of $\vec{w}$ even by the tiniest finite amount can completely scramble the trajectory generated by Eqns. (11) and (12). Thus, the cost function (Eqn. (17)) can be overly sensitive to changes in $\vec{w}$. In other words, the surface of the cost function in the $\vec{w}$-space as shown by FIG. 5 (see FIG. 5A) can be extremely crinkly. In FIG. 5A, the error surface is difficult for gradient descent algorithms. Hence it may be difficult to train the current-loop action network effectively.

Figure 5B:
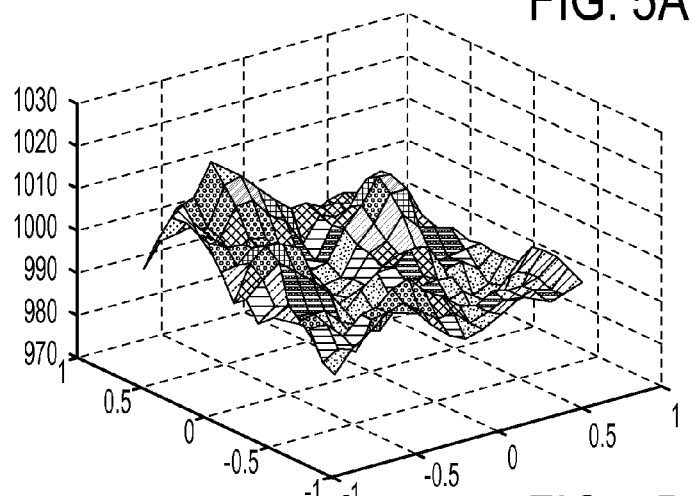

The stabilization matrix is effectively a hand-picked weight matrix which helps the current-loop action network do its job more effectively. It works partly by smoothing out the crinkliness of the cost function, which makes the surface more like FIG. 5B than FIG. 5A. In FIG. 5B, the error surface is smoother and easier for gradient descent algorithms.

Figure 6:
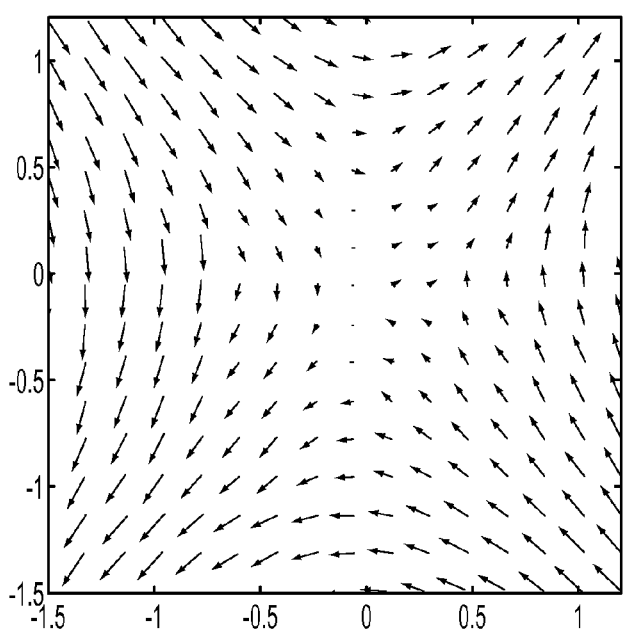
FIG. 6 is a graph illustrating how the state vector evolves if an action network chooses completely passive actions.

Referring now to FIG. 6, a graph illustrating how the state vector evolves if an action network chose completely passive actions is shown, e.g., $\vec{u}_{sdq}=\vec{0}$ and $\vec{e}_{dq}=\vec{0}$. In this case, the state vector would drift around the state space like a cork floating on an ocean current.

To solve the tracking problem, the task of the current-loop action network can be split into two stages. First, to fight against moving with the arrows in FIG. 6, which will most likely take the state away from the target state $\vec{i}_{sdq}^*$. Then, secondly, to actively head towards the tracking target point $\vec{i}_{sdq}^*$. The idea of the stabilization matrix is to make the first of these two objectives automatic. This should make the current-loop action network's task much simpler. The presence of the stabilization matrix should make the arrows in FIG. 6 vanish. To achieve this, first find the fixed point of Eqn. (11) with respect to the control action by:

$$\vec{i}_{sdq}=A\vec{i}_{sdq}+B(\vec{u}_{sdq}-\vec{e}_{dq})$$

$$\vec{0}=(A-I)\vec{i}_{sdq}+B(\vec{u}_{sdq}-\vec{e}_{dq})$$

$$\vec{u}_{sdq}-\vec{e}_{dq}=-B^{-1}(A-I)\vec{i}_{sdq}$$

$$\vec{u}_{sdq}=-B^{-1}(A-I)\vec{i}_{sdq}+\vec{e}_{dq}$$

where I is the identity matrix. Choosing this action will help keep the AC electrical machine in exactly the same state.

The stabilization matrix is a very useful addition to the neural network vector control system because with the feedback present the current-loop action network is effectively a recurrent neural network, which is challenging to train correctly and consistently. Furthermore, according to the techniques discussed herein, the current-loop action network learns to overcome the challenge of coping with rapidly changing target states and random variation of parameters of the AC electrical machine. Hence the stabilization matrix helps to make the current-loop action network training achieve consistently good results. For example, the stabilization matrix helps prevent the current-loop action network training from getting trapped in suboptimal local minima.

Speed-Loop Neural Network Vector Control

Referring again to FIG. 4, to develop a speed-loop neural network controller 420, the torque equation from Eqn. (7) is rearranged into the standard state-space representation as shown by Eqn. (13).

$$d\omega_m/dt=B_a\omega_m/J_{eq}+(\tau_{em}-T_L)/J_{eq} \quad (13)$$

where the system state is $\omega_m$ and the drive torque $\tau_{em}$ is proportional to the output of the speed-loop action network. The conversion from the torque to the q-axis current (e.g., the reference q-axis current, $i_{sq}^*$) is obtained from Eqn. (5). For digital control implementations, the discrete equivalent of the continuous state-space model can be obtained as shown by Eqn. (14).

$$\omega_m(kT_s+T_s)=a\cdot\omega_m(kT_s)+b\cdot[\tau_{em}(kT_s)-T_L] \quad (14)$$

The output of the speed-loop neural network 420A, also referred to herein as the speed-loop action network, is applied to the input of the current-loop action network as the reference q-axis current, $i_{sq}^*$. Similar to the current-loop action network, the speed-loop action network is a fully connected multi-layer perceptron with weight vector $\vec{w}$, an input layer with a plurality of input nodes, a plurality of hidden layers with a plurality of hidden layer nodes and an output layer with a plurality of output nodes. The multi-layer perceptron can have shortcut connections between all pairs of layers. Optionally, the multi-layer perceptron includes at least four input nodes, two hidden layers of six hidden layer nodes each and two output nodes. Alternatively or additionally, each of the nodes can be configured to implement a hyperbolic tangent function. It should be understood that the multi-layer perceptron can include the number of input nodes, hidden layer nodes and output nodes needed to implement the control techniques described herein.

The control signal generated by the speed-loop action network is shown by Eqn. (15).

$$\tau_{em}(k)=k_\tau A_\omega(\vec{x}_\omega(k),\vec{w}_\omega)+W_{0\omega}\omega_m(k)+T_L=k_\tau\tau_{Aem}(k)+W_{0\omega}\omega_m(k)+T_L \quad (15)$$

where
$\vec{x}_\omega(k)=(\omega_m(k),\omega_m^*(k)-\omega_m(k),\omega_m(k)-\hat{\omega}_m(k),\tau_{Aem}(k-1))$
contains all the network inputs, and $\vec{w}_\omega$ is the weight vector of the speed-loop action network. The speed-loop action network can be configured to optimize a drive torque signal based on the plurality of inputs. Similar to the current-loop action network, the speed-loop action network can use predictive inputs, as well as previous speed-loop control actions. As shown by Eqn. (15), the plurality of inputs can be a speed of the AC electrical machine, $\omega_m$, a speed error signal, a predicted speed signal and a feedback drive torque signal (e.g., output of the speed-loop action network at a previous time step). The speed error signal can be a difference between $\omega_m$ and a reference speed, $\omega_m^*$. Additionally, $\hat{\omega}_m(k)$ is the predicted speed calculated with a fixed model shown by Eqn. (16).

$$\hat{\omega}_m(k)=a_0\cdot\omega_m(k-1)+b_0\cdot[\tau_{em}(k-1)-T_L] \quad (16)$$

where $a_0$ and $b_0$ are the constant values of Eqn. (14) chosen for the default AC electrical machine (e.g., PMSM 401) inertias and damping coefficient. In other words, the predicted speed signal can optionally be a difference between $\omega_m$ and a predicted speed signal, $\omega_m'$, where $\omega_m'$ is computed using a speed prediction model. As shown in Eqn. (16), the speed prediction model can be based on $\omega_m$ and $\tau_{em}$ at a previous time step and default parameters for the AC electrical machine.

Optionally, the inputs to the speed-loop neural network can further include an integral of the speed error signal. The integral of the speed error signal can provide the speed-loop action neural network with a history of the speed-loop error signals. The integral term provides a history of all past errors by summing errors together. For example, if there is an error in a given time step, the error is added to the integral term for the next time step. Thus, the integral term will only stay the same as it was at a previous time step if there is no error in a speed time step, which prevents the action neural network from stabilizing at a non-target value. This helps to minimize steady state errors.

Also similar to the current-loop action network, the drive torque signal, $\tau_{em}$, can optionally be adjusted by a drive-torque stabilization matrix that is based on default parameters for the AC electrical machine (e.g., PMSM 401). The use of a stabilization matrix is discussed in detail above and is therefore not discussed in further detail below.

Training Neural Networks Based Upon Dynamic Programming

DP employs the principle of optimality and is a very useful tool for solving optimization and optimal control problems. Action neural networks (e.g., current-loop neural network 410A and/or speed-loop neural network 420A of FIG. 4) can be trained to minimize a cost of the DP algorithm (described below) using a BPTT algorithm. The BPTT algorithm is gradient descent on $J(\vec{x}(j),\vec{w})$ with respect to the weight vector of the action neural network. The BPTT algorithm can be applied to an arbitrary trajectory with an initial state $i_{dq}(j)$, and thus be used to optimize the vector control strategy. In general, the BPTT algorithm consists of two steps: a forward pass which unrolls a trajectory, followed by a backward pass along the whole trajectory which accumulates the gradient descent derivative.

Training the Current-Loop Neural Network

The objective of the current-loop control (e.g., using current-loop neural network 410A of FIG. 4) is to implement a current tracking problem, e.g., hold the existing state $\vec{i}_{sdq}$ near to a given (and possibly moving) target state $\vec{i}_{sdq}^*$. The weights (e.g., $\vec{w}$) of the action network can be trained to solve the tracking problem by doing gradient descent with respect to $\vec{w}$ on Eqn. (17) based on the DP principle:

$$J(\vec{x}(j),\vec{w})=\sum_{k=j}^{K}\gamma^k\left|\vec{i}_{sdq}(k)-\vec{i}_{sdq}^*(k)\right|^m \quad (17)$$

where m is some constant power (e.g., m=0.5 in the examples), |•| denotes the modulus of a vector, and $\gamma\in[0,1]$ is a constant "discount factor". The current-loop action network was trained separately to minimize the DP cost in Eqn. (17), by using the BPTT algorithm. The BPTT algorithm was chosen because it is particularly suited to situations where the model functions are known and differentiable, and also because BPTT has proven stability and convergence properties since it is a gradient descent algorithm—provided the learning rate is sufficiently small. In general, the BPTT algorithm consists of two steps: a forward pass which unrolls a trajectory, followed by a backward pass along the whole trajectory, which accumulates the gradient descent derivative. For the termination condition of a trajectory, a fixed trajectory length corresponding to a real time of 1 second is used (e.g., a trajectory had $1/T_s=1000$ time steps in it). $\gamma=1$ is for the discount factor in Eqn. (17).

To train the current-loop action network, the system data associated with Eq. (8) are specified. The training procedure for the current-loop action network includes: (1) randomly generating a sample initial state $i_{sdq}(j)$, (2) randomly generating a changing sample reference dq current time sequence, (3) unrolling the trajectory of the neural network vector control system from the initial state, (4) training the current-loop action network based on the DP cost function in Eqn. (17) and the BPTT training algorithm, and (5) repeating the process for all the sample initial states and reference dq currents until a stop criterion associated with the DP cost is reached. The weights were initially all randomized using a Gaussian distribution with zero mean and 0.1 variance. The training also considers variable nature of the AC electrical machine (e.g., PMSM) resistance and inductance. Training used Resilient backpropagation ("RPROP") to accelerate learning. RPROP was allowed to act on multiple trajectories simultaneously (each with a different start point and $i_{sdq}^*$).

Example algorithms for BPTT for PMSM vector control with and without the stabilization matrix are provided below in Tables 1 and 2, respectively.

TABLE 1

Algorithm 1 BPTT for PMSM
Vector-control problem, with fixed A and B matrices

1: $J \leftarrow 0$
2: {Unroll a full trajectory:}
3: for k = 0 to K − 1 do
4: $\vec{u}_k \leftarrow k_{pwm} \pi(\vec{x}_k, \vec{x}_k^* - \vec{x}_k, \vec{w})$ {Neural network output}
5: $\vec{x}_{k+1} \leftarrow A\vec{x}_k + B(\vec{u}_k - \vec{c})$ {Calculate next state}
6: $J \leftarrow J + \gamma^k U(\vec{x}_k, \vec{x}_k^*, \vec{u}_k)$
7: end for
8: {Backwards pass along trajectory:}
9: $J\_\vec{w} \leftarrow \vec{0}$
10: $J\_\vec{x}_K \leftarrow \vec{0}$
11: for k = K − 1 to 0 step − 1 do
12: $J\_\vec{u}_k \leftarrow (B^T) J\_\vec{x}_{k+1} + \gamma^k \left( \dfrac{\partial U(\vec{x}_k, \vec{x}_k^*, \vec{u}_k)}{\partial \vec{u}_k} \right)$
13: $J\_\vec{x}_k \leftarrow k_{pwm} \left( \dfrac{d\pi(\vec{x}_k, \vec{x}_k^* - \vec{x}_k, \vec{w})}{d\vec{x}_k} \right) J\_\vec{u}_k + (A^T) J\_\vec{x}_{k+1} + \gamma^k \left( \dfrac{\partial U(\vec{x}_k, \vec{x}_k^*, \vec{u}_k)}{\partial \vec{x}_k} \right)$
14: $J\_\vec{w} \leftarrow J\_\vec{w} + k_{pwm} \left( \dfrac{\partial \pi(\vec{x}_k, \vec{x}_k^* - \vec{x}_k, \vec{w})}{\partial \vec{w}} \right) J\_\vec{u}_k$
15: end for
16: {On exit, $J\_\vec{w}$ holds $\dfrac{\partial J}{\partial \vec{w}}$ for the whole trajectory.}

TABLE 2

Algorithm 2 Enhanced BPTT for PMSM
Vector-control, with stabilization matrix and adaptive controller 1: $J \leftarrow 0, \hat{x}_0 \leftarrow \vec{x}_0, \vec{s}_0 \leftarrow \vec{0}$
2: {Unroll a full trajectory:}
3: for k = 0 to K − 1 do
4: $\vec{y}_k \leftarrow \pi(\vec{x}_k, \vec{x}_k^* - \vec{x}_k, \vec{x}_k - \hat{x}_k, \vec{s}_k, \vec{w})$ {Neural network output}
5: $\vec{u}_k \leftarrow k_{pwm} \vec{y}_k + W_0 \vec{x}_k + \vec{c}$ {Stabilized control action}
6: $\vec{x}_{k+1} \leftarrow A_k \vec{x}_k + B_k (\vec{u}_k - \vec{c})$ {Next state, using the time dependent $A_k$ and $B_k$ matrices}
7: $\hat{x}_{k+1} \leftarrow \overline{A}\vec{x}_k + \overline{B}(\vec{u}_k - \vec{c})$ {Predicted next state, according to the fixed $\overline{A}$ and $\overline{B}$ matrices}
8: $\vec{s}_{k+1} \leftarrow \vec{y}_k^*$ {Previous network output}
9: $J \leftarrow J + \gamma^k U(\vec{x}_k, \vec{x}_k^*, \vec{u}_k)$
10: end for
11: {Backwards pass along trajectory:}
12: $J\_\vec{w} \leftarrow \vec{0}$
13: $J\_\vec{x}_K \leftarrow \vec{0}, J\_\hat{x}_K \leftarrow \vec{0}, J\_\vec{s}_K \leftarrow \vec{0}$
14: for k = K − 1 to 0 step − 1 do
15: $J\_\vec{u}_k \leftarrow (B_k)^T J\_\vec{x}_{k+1} + \overline{B}^T J\_\hat{x}_{k+1} + \gamma^k \left( \dfrac{\partial U(\vec{x}_k, \vec{x}_k^*, \vec{u}_k)}{\partial \vec{u}_k} \right)$
16: $J\_\vec{y}_k \leftarrow k_{pwm} J\_\vec{u}_k + J\_\vec{s}_{k+1}$
17: $J\_\vec{x}_k \leftarrow \left( \dfrac{d\pi(\vec{x}_k, \vec{x}_k^* - \vec{x}_k, \vec{x}_k - \hat{x}_k, \vec{s}_k, \vec{w})}{d\vec{x}_k} \right) J\_\vec{y}_k + W_0^T J\_\vec{u}_k + (A_k)^T J\_\vec{x}_{k+1} + \overline{A}^T J\_\hat{x}_{k+1} + \gamma^k \left( \dfrac{\partial U(\vec{x}_k, \vec{x}_k^*, \vec{u}_k)}{\partial \vec{x}_k} \right)$
18: $J\_\hat{x}_k \leftarrow \left( \dfrac{\partial \pi(\vec{x}_k, \vec{x}_k^* - \vec{x}_k, \vec{x}_k - \hat{x}_k, \vec{s}_k, \vec{w})}{d\hat{x}_k} \right) J\_\vec{y}_k$ TABLE 2-continued Algorithm 2 Enhanced BPTT for PMSM
Vector-control, with stabilization matrix and adaptive controller 19: $J\_\vec{s}_k \leftarrow \left( \dfrac{\partial \pi(\vec{x}_k, \vec{x}_k^* - \vec{x}_k, \vec{x}_k - \hat{x}_k, \vec{s}_k, \vec{w})}{d\vec{s}_k} \right) J\_\vec{y}_k$
20: $J\_\vec{w} \leftarrow J\_\vec{w} + \left( \dfrac{\partial \pi(\vec{x}_k, \vec{x}_k^* - \vec{x}_k, \vec{x}_k - \hat{x}_k, \vec{s}_k, \vec{w})}{d\vec{w}} \right) J\_\vec{y}_k$
21: end for
22: {On exit, $J\_\vec{w}$ holds $\dfrac{\partial J}{\partial \vec{w}}$ for the whole trajectory.}

Generation of the reference current can consider the physical constraints of a practical PMSM. These include the rated current and converter PWM saturation constraints. From the power converter standpoint, the PWM saturation constraint represents the maximum voltage that can be generated and applied to the PWM circuit. From the current-loop action network standpoint, the PWM saturation constraint stands for the maximum positive or negative voltage that the current-loop neural network can output. Therefore, if a reference dq current requires a control voltage that is beyond the acceptable voltage range of the current-loop neural network, it is impossible to reduce the cost (e.g., Eqn. (17)) during the training of the action network.

The following two strategies are used to adjust randomly generated reference currents. If the rated current constraint is exceeded, the reference dq current is modified by keeping the q-axis current reference $i_{sq}^*$ unchanged to maintain torque control effectiveness (e.g., Eq. (5)) while modifying the d-axis current reference $i_{sd}^*$ to satisfy the d-axis control demand as much as possible as shown by Eqn. (18).

$$i_{sd\_new}^* = \text{sign}(i_{sd}^*) \cdot \sqrt{(i_{sd\_max}^*)^2 - (i_{sq}^*)^2} \quad (18)$$

If the PWM saturation limit is exceeded, the reference dq current is modified by Eqn. (19).

$$v_{sd}^* = -i_{sq}^* \omega_e L_q \; v_{sq}^* = \sqrt{(v_{sdq\_max}^*)^2 - (v_{sd}^*)^2}$$

$$i_{sd}^* = (v_{sq}^* - \omega_e \psi_f)/(\omega_e L_d) \quad (19)$$

which represents a condition of keeping the d-axis voltage reference $v_{sd}^*$ unchanged so as to maintain the torque control effectiveness (e.g., Eqns. (4) and (5)) while modifying the q-axis voltage reference $v_{sq}^*$ to meet the d-axis control demand as much as possible.

Figure 7:
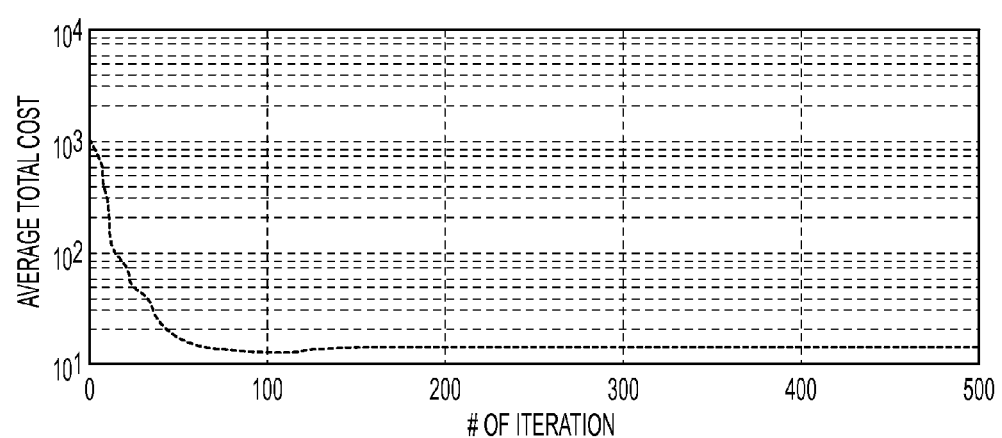
FIG. 7 is a graph illustrating an average DP cost per trajectory time step for training an example neural network.

Referring now to FIG. 7, a graph illustrating an average DP cost per trajectory time step for training an example neural network is shown. In particular, FIG. 7 demonstrates the average DP cost per trajectory time step for a successful training of the current-loop neural network 410A of FIG. 4, in which both the initial state and the reference dq currents are generated randomly using uniform distribution. Each trajectory duration was unrolled during training for a duration of 1 second, and the reference dq current was changed every 0.05 seconds. As shown in FIG. 7, the overall average DP cost dropped to a small number quickly, demonstrating good learning ability of the current-loop neural network for the vector control application.

Training the Speed-Loop Neural Network

The objective of the speed-loop control (e.g., using speed-loop neural network 420A of FIG. 4) is to implement a speed tracking problem, e.g., hold the existing state $\omega_m$ near to a given (and possibly moving) target state $\omega_m^*$. The weights $\vec{w}_\omega$ of the speed-loop action network are trained to solve the tracking problem by doing gradient descent with respect to $\vec{w}_\omega$ on Eqn. (20) based on the DP principle:

$$J(\vec{x}_m(j), \vec{w}_\omega) = \sum_{k=j}^{K} \gamma_s^i |\omega_m(k) - \omega_m^*(k)|^n \quad (20)$$

To train the speed-loop action network, the system data associated with Eq. (14) are specified. The training procedure includes: (1) randomly generating a sample initial state $\omega_m$, (2) randomly generating a changing sample reference speed time sequence, (3) unrolling the motor speed trajectory from the initial state, (4) training the speed-loop action network based on the DP cost function of Eqn. (20) and the BPTT training algorithm, and (5) repeating the process for all the sample initial states and reference speeds until a stop criterion associated with the DP cost is reached. Speed-loop training also used RPROP. The generation of the reference speed considers the speed changing range from 0 rad/s to the maximum possible motor rotating speed. The training considers variable nature of the inertia and the damping coefficient and the limitation of maximum acceptable torque. Example algorithms for BPTT for PMSM vector control with and without the stabilization matrix are provided below in Tables 1 and 2, respectively.

Examples

Performance Evaluation of Nested-Loop Neural Network Controller

Figure 8:
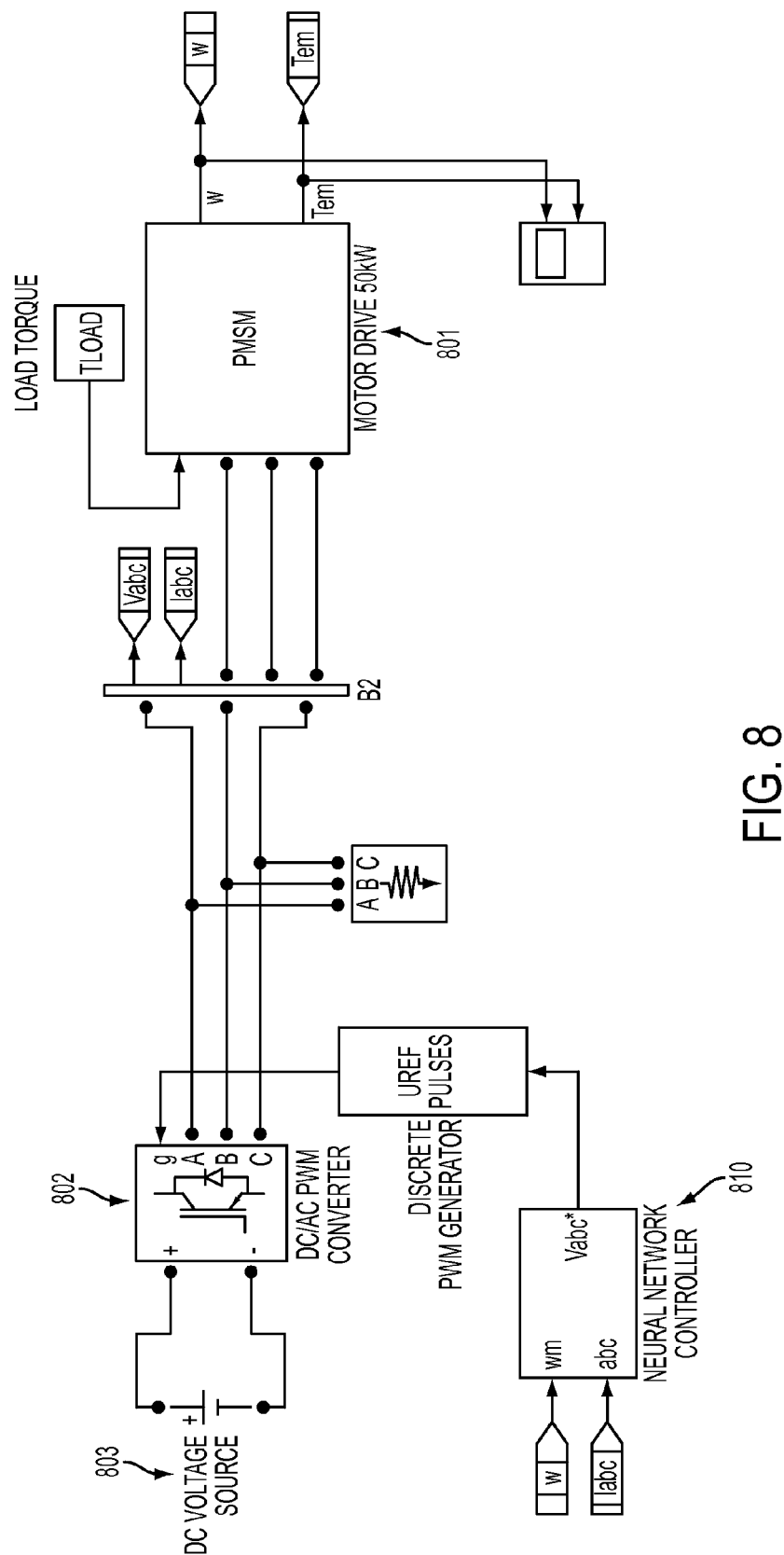
FIG. 8 is a block diagram illustrating a neural network vector control system for a PMSM used for the simulations.

An integrated transient simulation of a complete PMSM system is developed by using power converter average and detailed switching models in SIMPOWERSYSTEMS made by MATHWORKS of NATICK, Mass. A block diagram illustrating a neural network vector control system for a PMSM used for the simulations is shown in FIG. 8. The block diagram includes a PMSM 801, a DC/AC PWM converter 802, an electrical power source 803 and a neural network control system 810. The average model is used for an initial evaluation while the detailed switching model is used for investigation under more practical conditions. For the switching-model based PMSM system, the converter switching frequency is 1980 Hz and losses within the DC/AC power converter are considered. The parameters used in the simulation study are shown in Table 3.

TABLE 3

| Parameter | Value | Units |
| --- | --- | --- |
| Rated Power | 50 | kW |
| dc voltage | 500 | V |
| Permanent magnet flux | 0.1757 | wb |
| Inductance in q-axis, $L_q$ | 1.598 | mH |
| Inductance in d-axis, $L_d$ | 1.598 | mH |
| Stator copper resistance, $R_s$ | 0.0065 | Ω |
| Inertia | 0.089 | kg · m² |
| Damping coefficient | 0.1 | |
| Pole pairs | 4 | |

Two approaches are used to prevent high motor current. First, the speed reference applied to the speed-loop controller is processed through a ramp limit, which is very effective to prevent rapidly-changing high current from being applied to the motor. Second, if the increase of speed reference causes the current reference generated by the speed-loop controller to go beyond its rated current, any speed reference increment will be blocked.

Ability of the Neural Network Controllers in Current and Speed Tracking

Figure 9A:
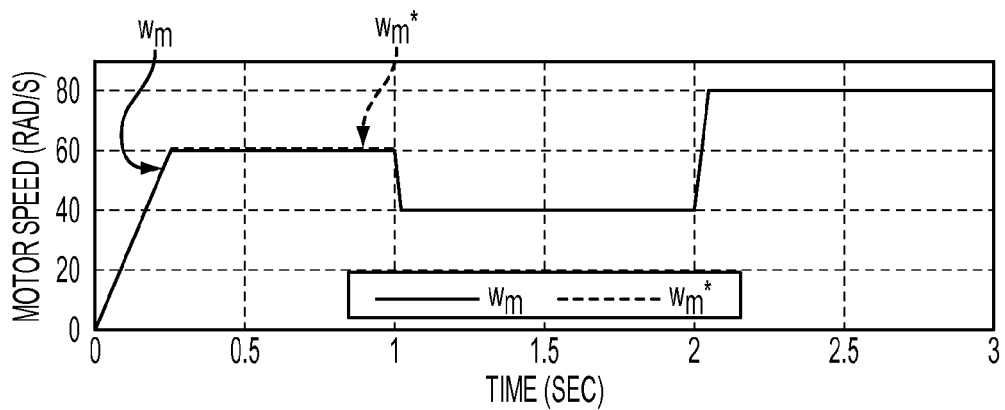
FIGS. 9A-9C are graphs illustrating performance of an example nested-loop neural network vector controller.
Figure 9B:
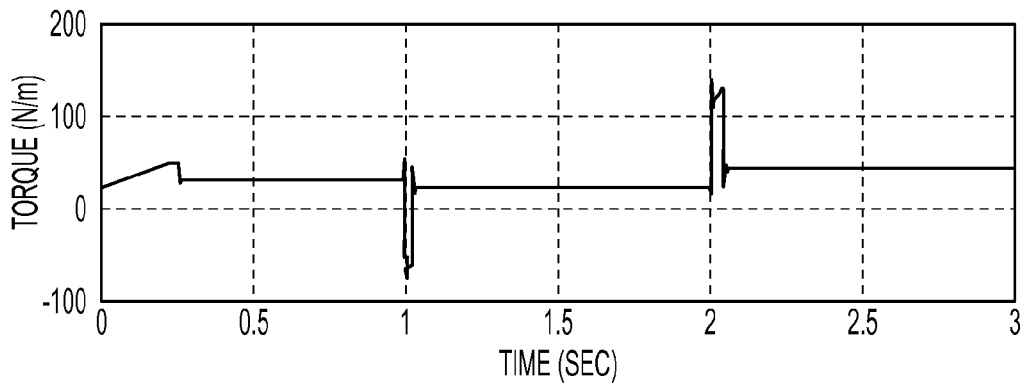
Figure 9C:
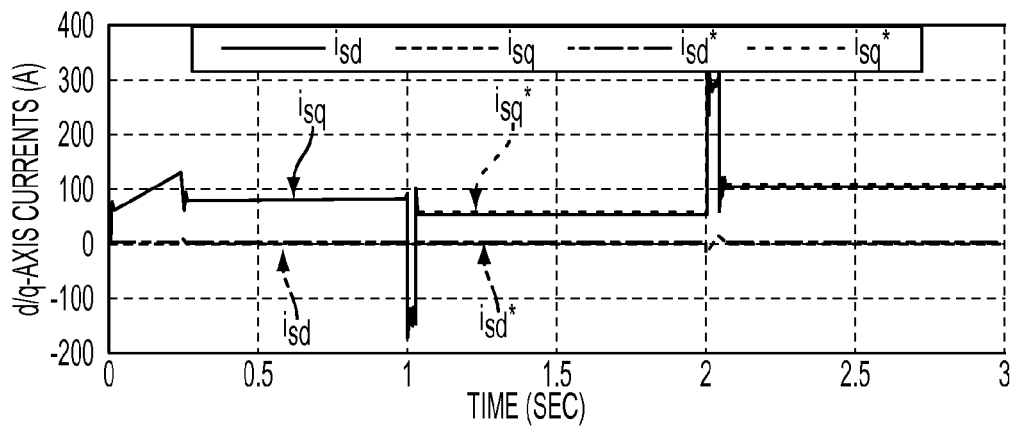

FIGS. 9A-9C are graphs illustrating performance of an example nested-loop neural network vector controller. FIGS. 9A-9C illustrate reference and actual motor (e.g., a PMSM) speeds. FIG. 9B illustrates electromagnetic torque. FIG. 9C illustrates reference and actual d- and q-axis currents. FIG. 9 presents a performance study of the current- and speed-loop neural network controllers of a PM motor under a steady load torque condition by using the average-model based simulation. The motor starts with a reference speed increasing linearly from 0 rad/s at the beginning to 60 rad/s at t=0.25 s. This causes the q-axis reference current generated by the speed-loop controller increasing linearly while d-axis reference current is hold at OA for a minimum stator current control purpose. As shown in FIGS. 9A-9C, both motor current and speed can follow the reference current and speed perfectly. When the reference speed changes to a constant value of 60 rad/s at t=0.25 s, the motor current or torque is quickly regulated in such a way that makes the motor get to the steady speed almost immediately. For other reference speed changes from 60 rad/s to 40 rad/s at t=1 s and from 40 rad/s to 80 rad/s at t=2 s, the nested-loop neural network vector controller shows excellent performance to meet the motor control demands as shown by FIG. 9.

Comparison of Neural Network Controller with Conventional Vector Control Method

Figure 10A:
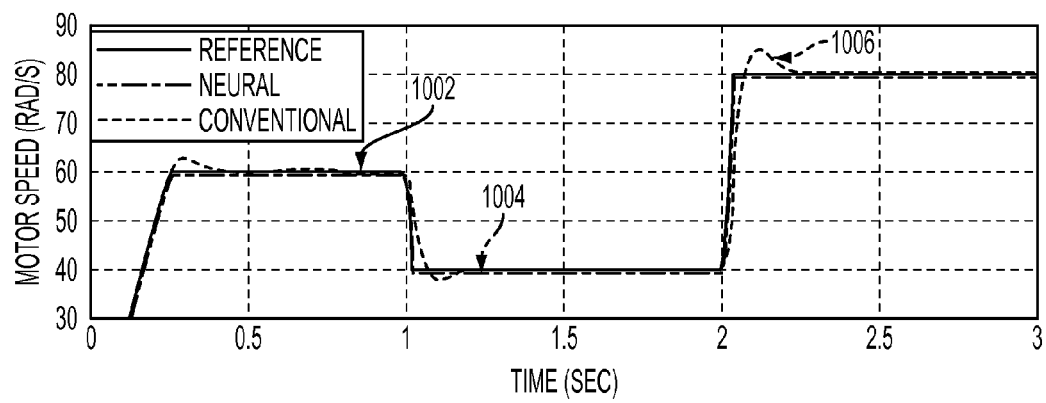
FIGS. 10A-10B are graphs illustrating a comparison of a conventional PI controller and a nested-loop neural network vector controller.
Figure 10B:
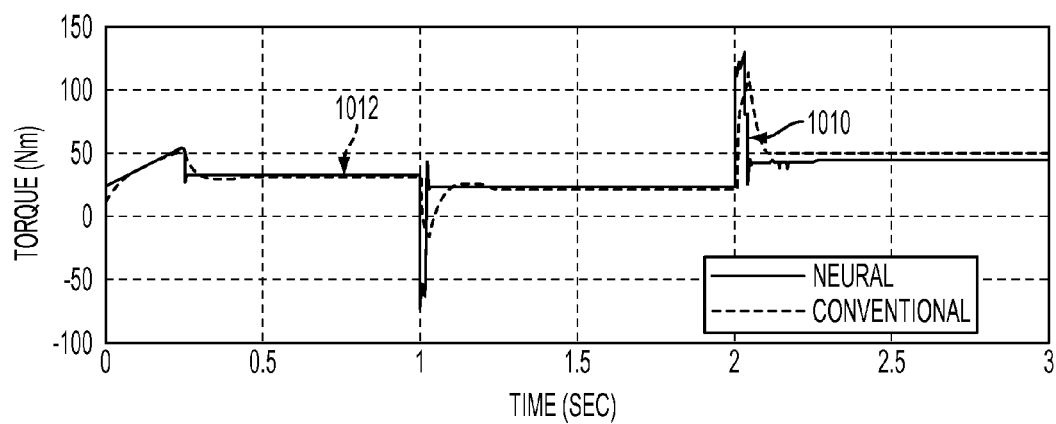

FIGS. 10A-10B are graphs illustrating a comparison of a conventional PI controller and a nested-loop neural network vector controller. FIG. 10A illustrates reference and actual motor speeds. Reference speed 1002, PMSM speed using a neural network vector controller 1004 and PMSM speed using a conventional PI controller 1006 are shown in FIG. 10A. FIG. 10B illustrates electromagnetic torque. PMSM torque using a neural network vector controller 1010 and PMSM torque using a conventional PI controller 1012 are shown in FIG. 10B. For the comparison study, the current- and speed-loop PI controllers are designed by using the conventional standard vector control techniques described above. The gains of the current-loop PI controller are designed based on the following transfer functions:

$$v_{sd} = (R_s i_{sd} + L_d di_{sd}/dt) - \omega_e L_q i_{sq}$$

$$v_{sq} = (R_s i_{sq} + L_q di_{sq}/dt) + \omega_e L_d i_{sd} + \omega_e \psi_f$$

The gains of the speed-loop PI controller are designed based on the transfer function of Eqn. (7). Then, for digital control implementation of the PI controllers at the sampling rate of $T_s = 1$ ms, the controller gains for both the speed and current loops are retuned until the controller performance is acceptable. Tuning of the PI controllers is a challenging task, particularly for a low sampling rate, such as $T_s = 1$ ms. The comparison shown by FIG. 10 indicates that the neural network vector controller has the fastest response time, low overshoot, and best performance. For many other reference current conditions, the comparison demonstrates that the neural network vector controller performs better.

Performance Evaluation Under Variable Parameters of a PMSM

PMSM stability is an issue to consider. In general, studies primarily focus on the motor performance under uncertain system parameter variations. These include changes of motor resistance and inductance from its nominal values or changes of fraction coefficient and combined inertia. Those changes affect the performance of the current- or speed-loop controller.

Figure 11A:
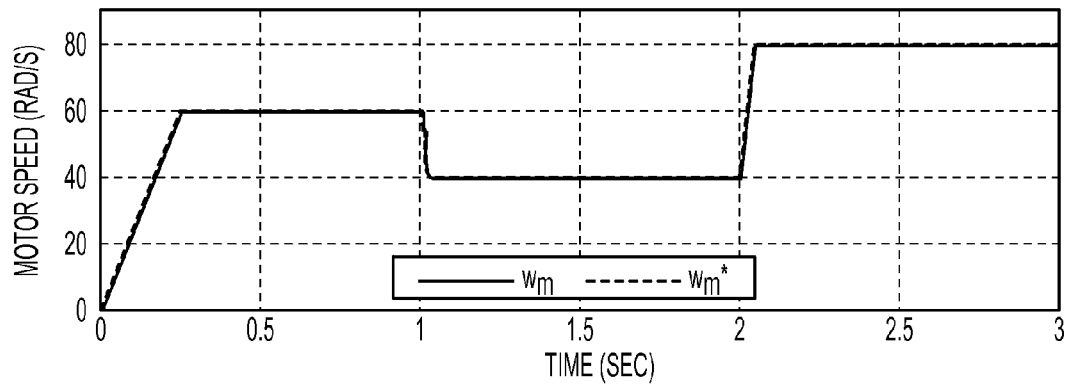
FIGS. 11A-11B are graphs illustrating performance of an example neural vector controller under variable system parameter conditions.
Figure 11B:
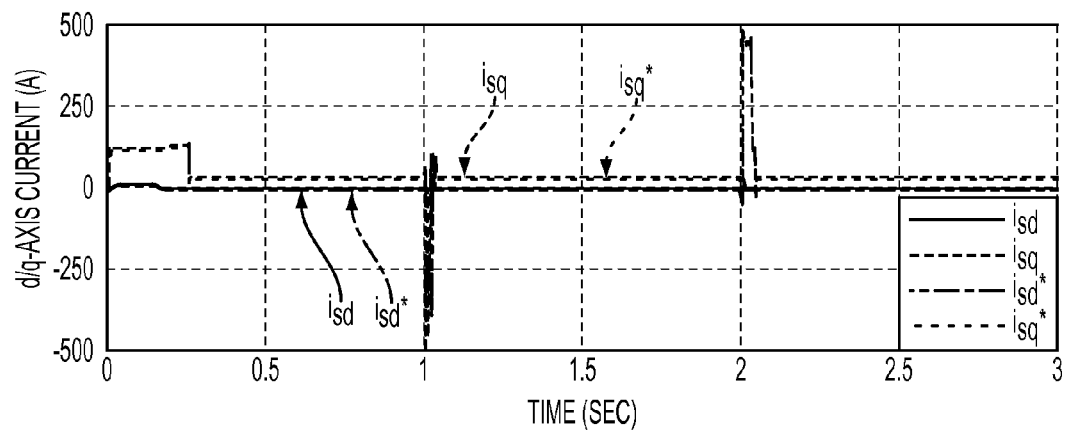

The stability of the nested-loop neural control technique is evaluated for two variable system parameter conditions, namely, 1) variation of motor resistance and inductance, and 2) deviation of motor drive parameters associated with the torque-speed of Eqn. (7). FIGS. 11A-11B are graphs illustrating performance of an example neural vector controller under variable system parameter conditions (e.g., changes in motor resistance and inductance values). In particular, FIG. 11A-11B illustrate how an example neural network vector controller is affected when the motor resistance and inductance values increase by 30% from the initial values and the equivalent inertia $J_{eq}$ is doubled. FIG. 11A illustrates motor speed. FIG. 11B illustrates d- and q-axis currents. FIGS. 11A-11B show that both the current- and speed-loop neural network controllers are affected very little by the system parameter variation. This is due to the fact that both the speed- and current-loop neural network controllers have been trained for the variable system parameter conditions so that the neural network controllers possess strong robustness to handle the motor control under variable system parameter conditions.

Performance Evaluation in Power Converter Switching Environment

PMSM control is achieved through power electronic converters, which operate in a highly dynamic switching environment. This causes high order harmonics in the three-phase PMSM stator voltage and current. This means that in the dq reference frame, large oscillations would appear in stator voltage and current. Since these oscillation impacts are not considered during the training stage of the neural networks, the behavior of the neural network controller is investigated in the power converter switching environment.

Figure 12A:
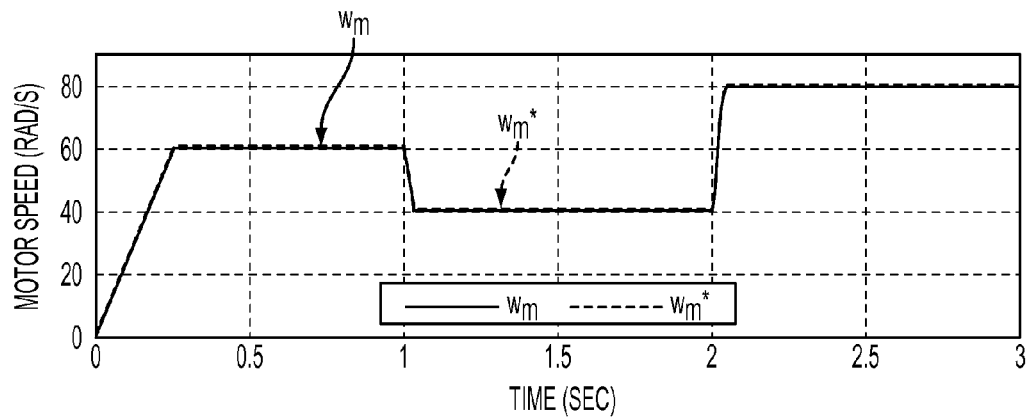
FIGS. 12A-12C are graphs illustrating a case study of an example neural network vector controller in a switching environment of the power converter.
Figure 12B:
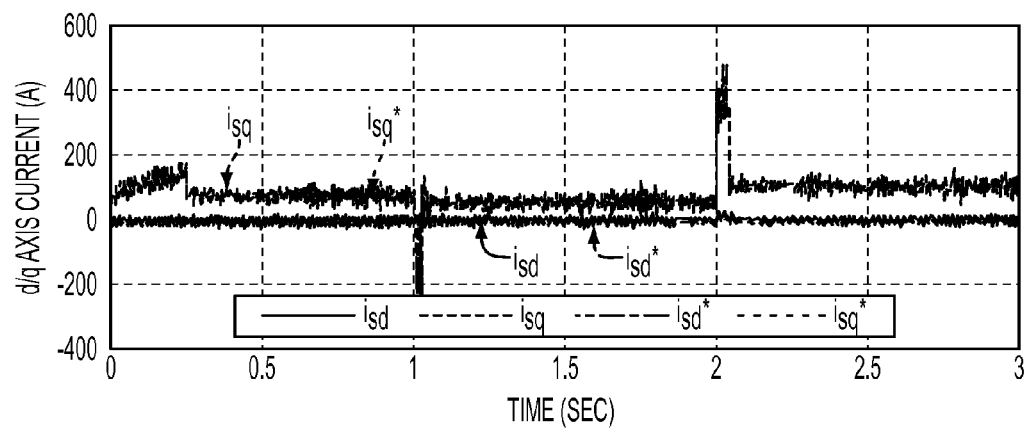
Figure 12C:
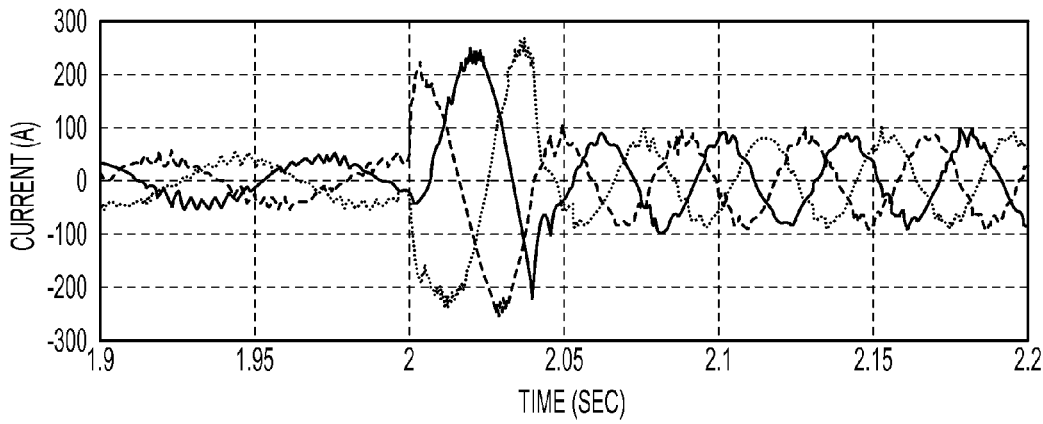

FIGS. 12A-12C are graphs illustrating a case study of an example neural network vector controller in the switching environment of the power converter, in which the speed reference is similar to those used in FIGS. 9A-9C. FIG. 12A illustrates reference and actual motor speed. FIG. 12B illustrates d- and q-axis currents. FIG. 12C illustrates three-phase stator current. As shown in FIG. 12A-12C, the neural network control shows an excellent performance in the switching condition too. Due to the switching impact, the actual dq current oscillates around the reference current. An examination of the stator current shows that the three-phase current is very balanced and adequate. For any command change of the reference speed, the motor can be adjusted to a new balanced three-phase current and a new speed quickly, demonstrating a strong optimal control capability of the neural network vector control method even in the highly dynamic switching conditions.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for controlling an AC electrical machine, comprising:
   providing a pulse-width modulated ("PWM") converter operably connected between an electrical power source and the AC electrical machine;
   providing a neural network vector control system operably connected to the PWM converter, the neural network vector control system comprising a current-loop neural network and a speed-loop neural network, wherein at least one of the current-loop neural network and the speed-loop neural network is configured to implement a dynamic programming ("DP") algorithm;
   receiving a plurality of inputs at the current-loop neural network, wherein the plurality of inputs comprise:
      a d-axis current, $i_{sd}$, and a q-axis current, $i_{sq}$,
      a d-axis error signal and a q-axis error signal, wherein the d-axis error signal comprises a difference between $i_{sd}$ and a reference d-axis current, $i_{sd}^*$, and the q-axis error signal comprises a difference between $i_{sq}$ and a reference q-axis current, $i_{sq}^*$,
      an integral of d-axis error signal and an integral of q-axis error signal;
      a predicted d-axis current signal and a predicted q-axis current signal; and
      a feedback compensating dq-control voltage;
   outputting a compensating dq-control voltage from the current-loop neural network, wherein the current-loop neural network is configured to optimize the compensating dq-control voltage based on the plurality of inputs; and
   controlling the PWM converter using the compensating dq-control voltage,
   wherein at least one of the current-loop neural network and the speed-loop neural network is trained to minimize a cost function of the DP algorithm using a backpropagation through time ("BPTT") algorithm by unrolling a trajectory of the neural network vector control system from an initial state and training the current-loop neural network or the speed-loop neural network based on the cost function of the DP algorithm and the BPTT algorithm.

2. The method of claim 1, wherein a predicted d-axis current signal further comprises a difference between $i_{sd}$ and a predicted d-axis current, $i_{sd}'$, and a predicted q-axis current signal further comprises a difference between $i_{sq}$ and a predicted q-axis current, $i_{sq}'$, wherein $i_{sd}'$ and $i_{sq}'$ are computed using a current prediction model.

3. The method of claim 2, wherein the current prediction model is based on $i_{sd}$, $i_{sq}$ and the compensating dq-control voltage at a previous time step and default parameters for the AC electrical machine.

4. The method of claim 1, wherein the compensating dq-control voltage is adjusted by a stabilization matrix, the stabilization matrix being based on default parameters for the AC electrical machine.

5. The method of claim 1, wherein the method further comprises:
   receiving a plurality of inputs at the speed-loop neural network, wherein the plurality of inputs comprise:
      a speed of the AC electrical machine, $\omega_m$,
      a speed error signal comprising a difference between $\omega_m$ and a reference speed, $\omega_m^*$,
      an integral of speed error signal;
      a predicted speed signal; and
      a feedback drive torque signal; and
   outputting a drive torque signal, $\tau_{em}$, from the speed-loop neural network, wherein the speed-loop neural network is configured to optimize the drive torque signal, $\tau_{em}$, based on the plurality of inputs, and wherein the drive torque signal, $\tau_{em}$, is converted into the reference q-axis current, $i_{sq}^*$.

6. The method of claim 5, wherein a predicted speed signal further comprises a difference between $\omega_m$ and a predicted speed signal, $\omega_m'$, wherein $\omega_m'$ is computed using a speed prediction model.

7. The method of claim 5, wherein the drive torque signal, $\tau_{em}$, is adjusted by a drive-torque stabilization matrix, the drive-torque stabilization matrix being based on default parameters for the AC electrical machine.

8. The method of claim 6, wherein the speed prediction model is based on $\omega_m$ and $\tau_{em}$ at a previous time step and default parameters for the AC electrical machine.

9. The method of claim 1, wherein at least one of the current-loop neural network and the speed-loop neural network comprises a multi-layer perceptron including a plurality of input nodes, a plurality of hidden layer nodes and a plurality of output nodes.

10. The method of claim 9, wherein each of the nodes is configured to implement a hyperbolic tangent function.

11. The method of claim 1, wherein the AC electrical machine is at least one of a permanent magnet synchronous machine and an induction machine.

12. A system for controlling an AC electrical machine, comprising:
a pulse-width modulated ("PWM") converter operably connected between an electrical power source and the AC electrical machine;
a neural network vector control system operably connected to the PWM converter, the neural network vector control system comprising a current-loop neural network and a speed-loop neural network, wherein at least one of the current-loop neural network and the speed-loop neural network is configured to implement a dynamic programming ("DP") algorithm, said current-loop neural network configured to;
receive a plurality of inputs at the current-loop neural network, wherein the plurality of inputs comprise:
a d-axis current, $i_{sd}$, and a q-axis current, $i_{sq}$,
a d-axis error signal and a q-axis error signal, wherein the d-axis error signal comprises a difference between $i_{sd}$ and a reference d-axis current, $i_{sd}^*$, and the q-axis error signal comprises a difference between $i_{sq}$ and a reference q-axis current, $i_{sq}^*$,
an integral of d-axis error signal and an integral of q-axis error signal;
a predicted d-axis current signal and a predicted q-axis current signal; and
a feedback compensating dq-control voltage; and
output a compensating dq-control voltage from the current-loop neural network, wherein the current-loop neural network is configured to optimize the compensating dq-control voltage based on the plurality of inputs, and wherein neural network vector control system controls the PWM converter using the compensating dq-control voltage,
wherein at least one of the current-loop neural network and the speed-loop neural network is trained to minimize a cost function of the DP algorithm using a backpropagation through time ("BPTT") algorithm by unrolling a trajectory of the neural network vector control system from an initial state and training the current-loop neural network or the speed-loop neural network based on the cost function of the DP algorithm and the BPTT algorithm.

13. The system of claim 12, wherein a predicted d-axis current signal further comprises a difference between $i_{sd}$ and a predicted d-axis current, $i_{sd}'$, and a predicted q-axis current signal further comprises a difference between $i_{sq}$ and a predicted q-axis current, $i_{sq}'$, wherein $i_{sd}'$ and $i_{sq}'$ are computed using a current prediction model.

14. The system of claim 13, wherein the current prediction model is based on $i_{sd}$, $i_{sq}$ and the compensating dq-control voltage at a previous time step and default parameters for the AC electrical machine.

15. The system of claim 12, wherein the compensating dq-control voltage is adjusted by a stabilization matrix, the stabilization matrix being based on default parameters for the AC electrical machine.

16. The system of claim 12, wherein the speed-loop neural network is configured to:
receive a plurality of inputs at the speed-loop neural network, wherein the plurality of inputs comprise:
a speed of the AC electrical machine, $\omega_m$,
a speed error signal comprising a difference between $\omega_m$ and a reference speed, $\omega_m^*$,
an integral of speed error signal;
a predicted speed signal; and
a feedback drive torque signal; and
output a drive torque signal, $\tau_{em}$, from the speed-loop neural network, wherein the speed-loop neural network is configured to optimize the drive torque signal, $\tau_{em}$, based on the plurality of inputs, and wherein the drive torque signal, $\tau_{em}$, is converted into the reference q-axis current, $i_{sq}^*$.

17. The system of claim 16, wherein a predicted speed signal further comprises a difference between $\omega_m$ and a predicted speed signal, $\omega_m'$, wherein $\omega_m$ is computed using a speed prediction model.

18. The system of claim 16, wherein the drive torque signal, $\tau_{em}$, is adjusted by a drive-torque stabilization matrix, the drive-torque stabilization matrix being based on default parameters for the AC electrical machine.

19. The system of claim 17, wherein the speed prediction model is based on $\omega_m$ and $\tau_{em}$ at a previous time step and default parameters for the AC electrical machine.

20. The system of claim 12, wherein at least one of the current-loop neural network and the speed-loop neural network comprises a multi-layer perceptron including a plurality of input nodes, a plurality of hidden layer nodes and a plurality of output nodes.

21. The system of claim 20, wherein each of the nodes is configured to implement a hyperbolic tangent function.

22. The system of claim 12, wherein the AC electrical machine is at least one of a permanent magnet synchronous machine and an induction machine.

* * * * *